United States Patent
Miyamaru et al.

(10) Patent No.: US 12,233,960 B2
(45) Date of Patent: Feb. 25, 2025

(54) WORKING VEHICLE

(71) Applicant: KUBOTA CORPORATION, Osaka (JP)

(72) Inventors: Noriyuki Miyamaru, Sakai (JP); Kazuya Okubo, Sakai (JP); Yuki Takano, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/530,392

(22) Filed: Dec. 6, 2023

(65) Prior Publication Data

US 2024/0308602 A1 Sep. 19, 2024

(30) Foreign Application Priority Data

Mar. 13, 2023 (JP) .................. 2023-038678

(51) Int. Cl.
*B62D 49/06* (2006.01)
*E02F 9/16* (2006.01)

(52) U.S. Cl.
CPC .......... *B62D 49/0671* (2013.01); *E02F 9/166* (2013.01)

(58) Field of Classification Search
CPC ...... B62D 49/0671; B62D 33/06; E02F 9/166
USPC ..................................... 180/89.12
See application file for complete search history.

(56) References Cited

U.S. PATENT DOCUMENTS 5,984,036 A * 11/1999 Higuchi ............... F16F 1/3863
                                                              296/190.07
6,726,272 B1 * 4/2004 Puterbaugh ........ B62D 33/0604
                                                              296/190.07

FOREIGN PATENT DOCUMENTS

| EP | 1923301 A2 | 5/2008 |
| JP | H0616152 A * | 1/1994 |
| JP | 2010-264800 A | 11/2010 |

OTHER PUBLICATIONS

Computer generated English translation of EP 1923301 (Year: 2024).*
Computer generated English translation of JP H06-16152 (Year: 2024).*
Official Communication issued in corresponding European Patent Application No. 23214594.6, mailed on Jun. 10, 2024, 7 pages.

* cited by examiner

*Primary Examiner* — Paul N Dickson
*Assistant Examiner* — Tiffany L Webb
(74) *Attorney, Agent, or Firm* — Keating & Bennett, LLP

(57) ABSTRACT

A working vehicle includes a suspension including a damper to suppress vertical motion of a cabin over a vehicle body, and a restrictor to restrict the cabin at an upper limit position and/or a lower limit position. The restrictor includes a first stopper fixed to the vehicle body, and a second stopper fixed to the cabin. At least one of the first stopper or the second stopper includes a first cushion portion, and a second cushion portion softer than the first cushion portion. The first cushion portion and the second cushion portion are adjacent to each other in a direction intersecting a vertical direction, and the second cushion portion is contactable with a target of contact before the first cushion portion.

9 Claims, 20 Drawing Sheets

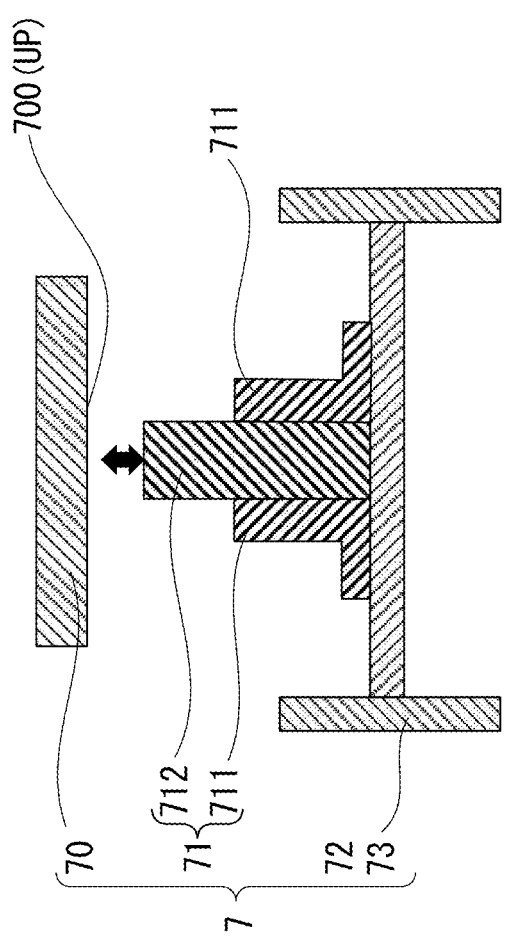

WORKING VEHICLE

CROSS REFERENCE TO RELATED APPLICATIONS

This application claims the benefit of priority to Japanese Patent Application No. 2023-038678 filed on Mar. 13, 2023. The entire contents of this application are hereby incorporated herein by reference.

BACKGROUND OF THE INVENTION

1. Field of the Invention

The present invention relates to a working vehicle such as a tractor.

2. Description of the Related Art

A working vehicle disclosed in Japanese Unexamined Patent Application Publication No. 2010-264800 is known.

The working vehicle disclosed in Japanese Unexamined Patent Application Publication No. 2010-264800 includes a cab portion where an operator sits. An anti-vibration connection structure is provided between a front portion of the cab portion and a vehicle body and between a rear portion of the cab portion and the vehicle body.

In the anti-vibration connection structure in Japanese Unexamined Patent Application Publication No. 2010-264800, a rear-side anti-vibration connection structure includes a vehicle-body-side rear mounting stay, a cabin-side rear mounting stay, a first anti-vibration rubber, a first mounting cover provided between the first anti-vibration rubber and the cabin-side rear-portion mounting stay, a second anti-vibration rubber provided on the opposite side of the cabin-side rear mounting stay from the first mounting cover, a second mounting cover provided on the opposite side of the second anti-vibration rubber from the cabin-side rear mounting stay, a fastening bolt, and a fastening nut.

The fastening bolt extends through the vehicle-body-side rear mounting stay, the first anti-vibration rubber, the first mounting cover, the cabin-side rear mounting stay, the second anti-vibration rubber, and the second mounting cover in this order. An anti-vibration connection structure in which two anti-vibration rubbers (the first anti-vibration rubber and the second anti-vibration rubber) are arranged in a vertical direction is obtained by fastening them with the fastening bolt screwed into the fastening nut.

In such a configuration, since the first anti-vibration rubber and the second anti-vibration rubber are arranged in the vertical direction and are fixed with the cabin-side rear mounting stay provided therebetween, vibrations transmitted to the cabin are reduced well.

SUMMARY OF THE INVENTION

However, in the working vehicle having the configuration described above, it is difficult to sufficiently reduce (absorb) vibrations transmitted to the cabin.

Specifically, the function of absorbing vibration and shocks of an anti-vibration rubber is related to the elastic properties of the material for the anti-vibration rubber. Therefore, the working vehicle having the configuration described above can absorb vibrations only within a limited range restricted by the elastic properties specific to the anti-vibration rubber.

Moreover, in the working vehicle described above, although vibrations are absorbed by two anti-vibration rubbers, since these two anti-vibration rubbers are arranged in the vertical direction, a load caused by vibrations and/or shock acts on the two anti-vibration rubbers simultaneously.

Therefore, the two anti-vibration rubbers become compressed and return to their original state simultaneously in response to vibrations (vertical motion) acting on the cabin. With this absorption of vibrations and shock is monotonous, similarly to the case where vibrations are absorbed by a single anti-vibration rubber.

It follows that, in the working vehicle having the configuration described above, vibration that occurs during travel is transmitted as an impact force to the cabin (is felt as an upward thrust).

Example embodiments of the present invention provide working vehicles each of which makes it possible to reduce vibrations and shock acting on a cabin during travel.

A working vehicle according to an aspect of an example embodiment of the present invention includes a vehicle body, a cabin, and a restrictor to restrict vertical motion of the cabin at at least one of an upper limit position or a lower limit position, wherein the restrictor includes a first stopper and a second stopper movable toward and away from the first stopper as the cabin moves vertically, at least one of the first stopper or the second stopper includes a first cushion portion and a second cushion portion softer than the first cushion portion, the first cushion portion and the second cushion portion being adjacent to each other in a direction intersecting a vertical direction, and the second cushion portion is contactable with the first stopper or the second stopper before the first cushion portion as the cabin moves vertically.

The second cushion portion may project toward the first stopper or the second stopper to a greater extent than the first cushion portion.

One of the first stopper and the second stopper may include a receiving surface which is planar. The other of the first stopper and the second stopper may include the first cushion portion and the second cushion portion. The first cushion portion and the second cushion portion may be oriented toward the receiving surface.

One of the first cushion portion and the second cushion portion may include a tubular portion. The other of the first cushion portion and the second cushion portion may be fitted in the tubular portion of the one of the first cushion portion and the second cushion portion.

The first cushion portion may include the tubular portion. The second cushion portion may be fitted in the tubular portion of the first cushion portion concentrically or substantially concentrically.

The first cushion portion may include a first tubular portion defining the tubular portion and including a distal end portion and a proximal end portion, and a first base portion connected to the proximal end portion of the first tubular portion, the first base portion extending from an inner circumference of the first tubular portion toward a center of an inner hole of the first tubular portion. The second cushion portion may include a second tubular portion including a distal end portion and a proximal end portion, and the proximal end portion of the second tubular portion may be fitted in the first tubular portion concentrically or substantially concentrically.

A distal end portion of the second cushion portion may project from the first cushion portion toward at least the other of the first stopper and the second stopper that is to be contacted by the distal end portion of the second cushion portion. A portion of the second cushion portion that projects from the first cushion portion may have a cross-sectional area that decreases in a direction from a proximal end toward a distal end.

The restrictor may include a pair of the first stoppers and a pair of the second stoppers. The pair of first stoppers may be displaced from each other at least in the vertical direction. One of the pair of second stoppers may be positioned such that the first cushion portion and the second cushion portion thereof are oriented toward one of the pair of first stoppers from below. The other of the pair of second stoppers may be positioned such that the first cushion portion and the second cushion portion thereof are oriented toward the other of the pair of first stoppers from above.

The restrictor may further include a mount portion coupled to the cabin, and a fastener to fasten the pair of second stoppers to the mount portion. Each of the pair of second stoppers may be configured such that the second cushion portion includes a second base portion connected to the proximal end portion of the second tubular portion, the second base portion extending from an inner circumference of the second tubular portion toward a center of an inner hole of the second tubular portion. The pair of first stoppers may face each other with a space therebetween in the vertical direction. The first base portions of the first cushion portions of the pair of second stoppers may sandwich the mount portion. The fastener may fasten the pair of second stoppers and the mount portion such that the fastener extends through the first base portions and the second base portions of the pair of second stoppers and the mount portion.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 20 is a schematic cross-sectional view of a restrictor of a working vehicle according to still another example embodiment of the present invention.

DETAILED DESCRIPTION OF EXAMPLE EMBODIMENTS

Figure 1:
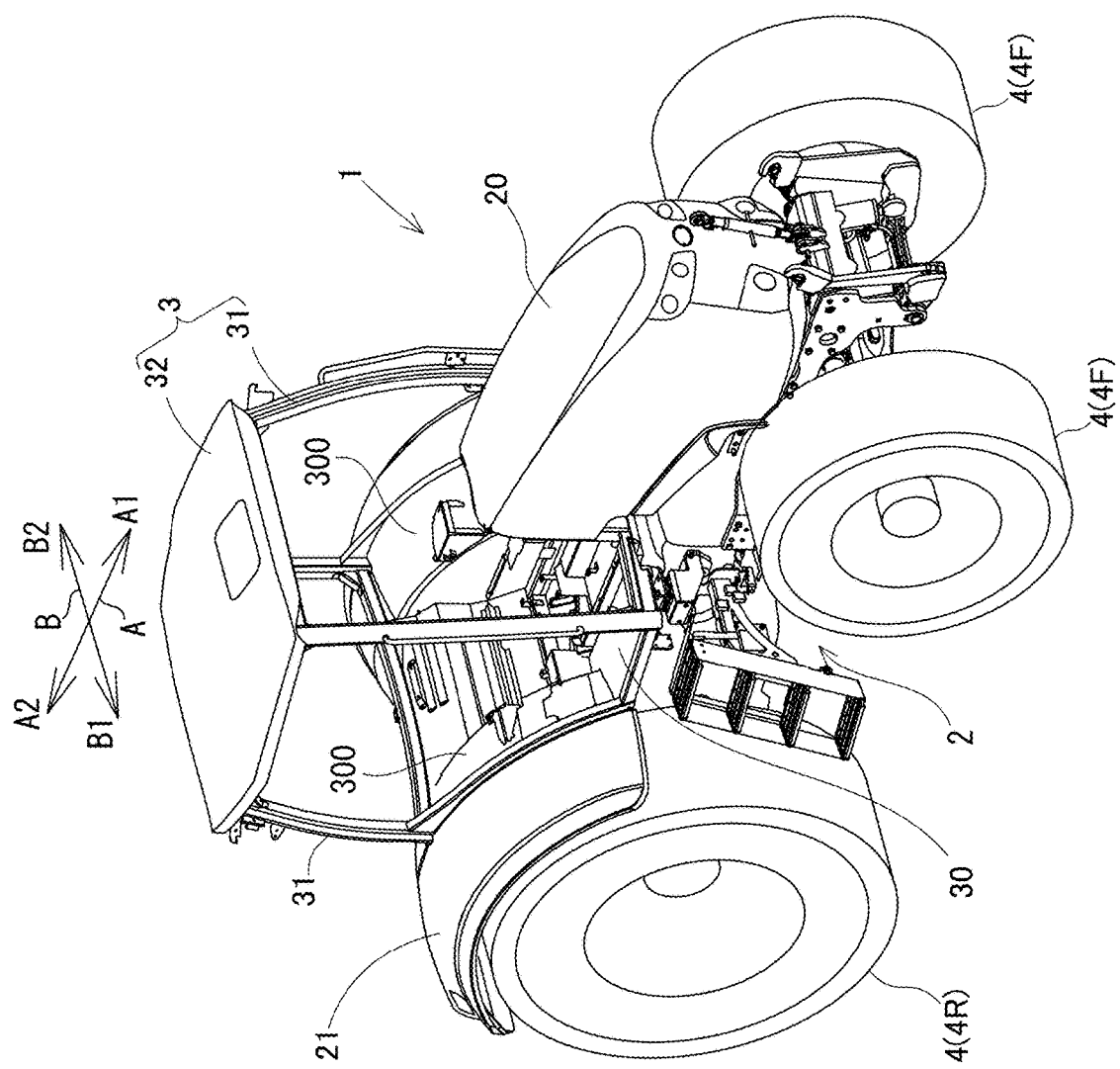
FIG. 1 is an external perspective view of a working vehicle (tractor) according to an example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

A working vehicle according to an example embodiment of the present invention will now be described while referring to the drawings. A working vehicle according to an example embodiment of the present invention may be, besides agricultural machines (agricultural vehicles) such as a combine and a transplanter, construction machines (construction vehicles) such as a loader working machine. The following description discusses an example case in which the working vehicle is a tractor.

Figure 2:
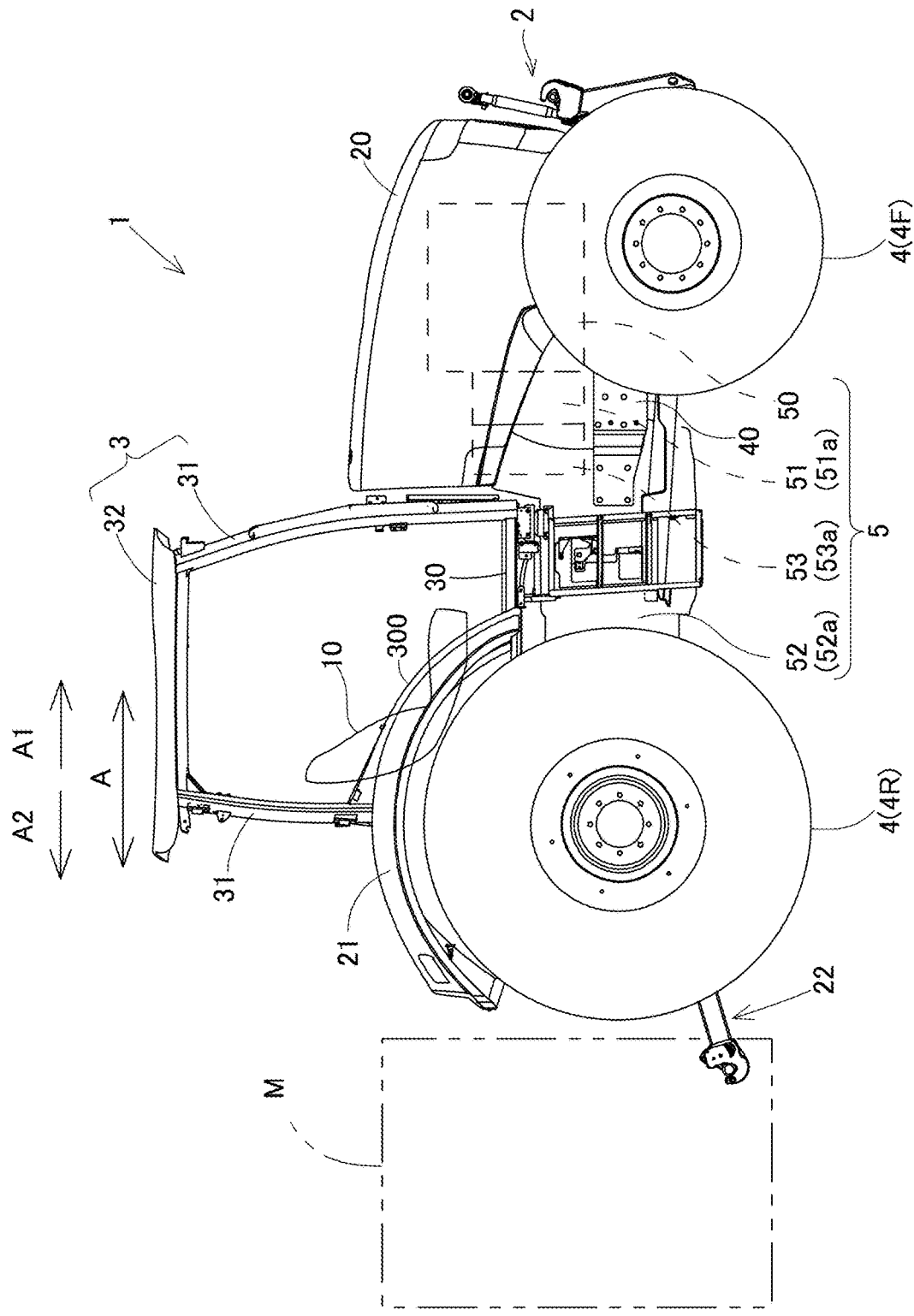
FIG. 2 is a right side view of a working vehicle (tractor) according to an example embodiment.
Figure 3:
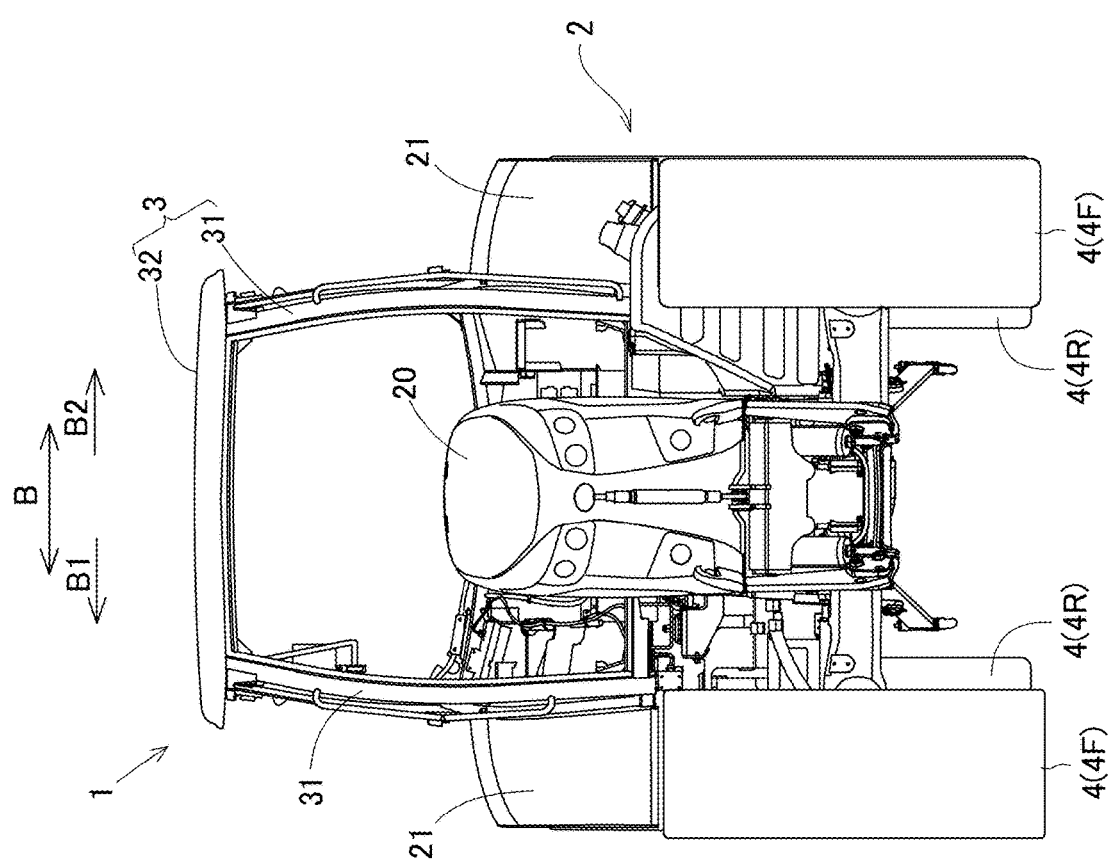
FIG. 3 is a front view of a working vehicle (tractor) according to an example embodiment.
Figure 4:
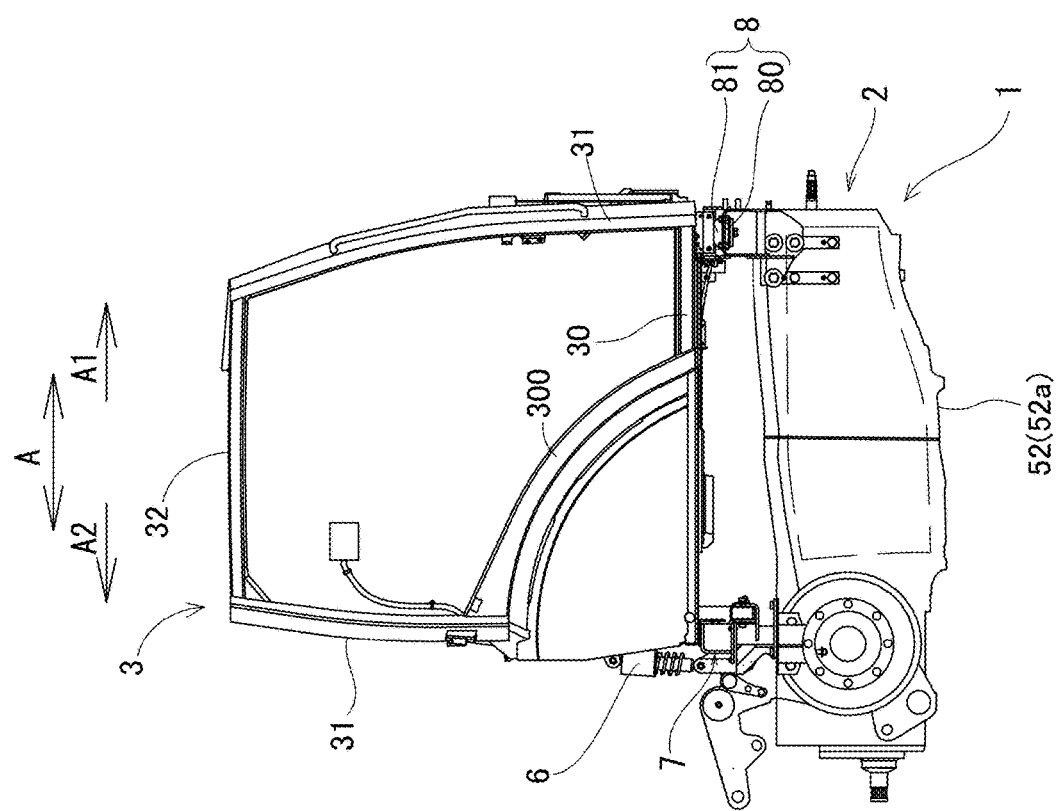
FIG. 4 is a right side view of a configuration of a main portion including a cabin portion, a transmission, and the like of a working vehicle according to an example embodiment.
Figure 5:
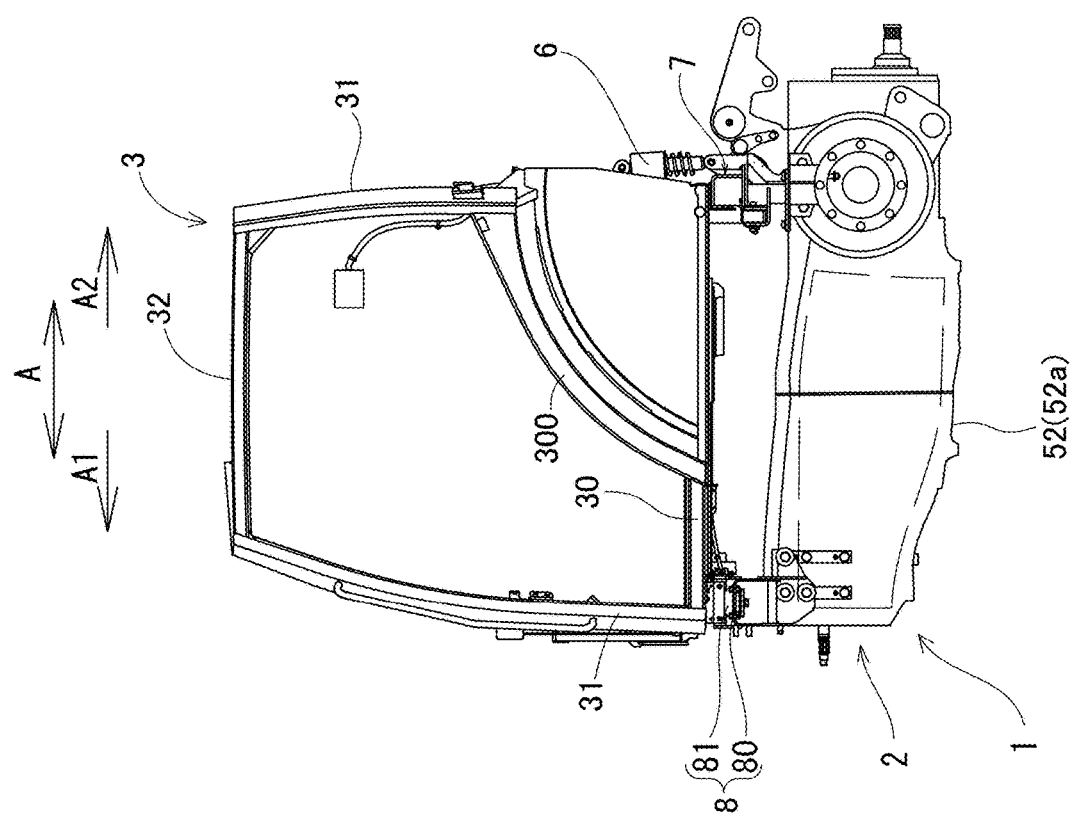
FIG. 5 is a left side view of the configuration of a main portion including a cabin portion, a transmission, and the like of a working vehicle according to an example embodiment.

FIG. 1 is a general perspective view of a working vehicle according to the present example embodiment. FIG. 2 is a right side view of the working vehicle. FIG. 3 is a front view of the working vehicle. FIG. 4 is a right side view of a main portion of the working vehicle in which the configuration of the working vehicle is partially omitted. FIG. 5 is a left side view of the main portion of the working vehicle in which the configuration of the working vehicle is partially omitted. FIGS. 6 to 10 are partial perspective views and partial cross-sectional views including features of the working vehicle.

In the description below, based on the premise that a working vehicle travels, the direction in which the working vehicle travels forward will be referred to as "forward", the direction in which the working vehicle travels rearward (backward) will be referred to as "rearward", and the direction along which the working vehicle travels forward and rearward will be referred to as "forward-rearward direction". The right side with respect to the working vehicle oriented in the forward-traveling direction will be referred to as "rightward", the left side with respect to the working vehicle oriented in the forward-traveling direction will be referred to as "leftward", and the direction orthogonal to the forward-rearward direction will be referred to as "width direction" or "lateral direction". In accordance with this definition, in each of the drawings, where necessary, the forward/front side is indicated by arrow A1, the rearward/rear side is indicated by arrow A2, the forward-rearward direction is indicated by arrow A, the rightward/right side is indicated by arrow B1, the leftward/left side is indicated by arrow B2, and the width direction or the lateral direction is indicated by arrow B.

As illustrated in FIGS. 1 to 3, a working vehicle (tractor) 1 includes a vehicle body 2 to travel and a cabin 3 provided on the vehicle body 2.

As illustrated in FIG. 2, in order to allow the vehicle body 2 to travel, the tractor 1 includes a traveling device 4 and a driving device 5 to drive the traveling device 4.

In addition to the above elements, as illustrated in FIGS. 4 and 5, the tractor 1 according to the present example embodiment includes a suspension 6 to support the cabin 3 on the vehicle body 2. The suspension 6 includes a damper 60 to suppress vertical motion of the cabin 3. The tractor 1 includes a restrictor 7 to restrict the vertical motion of the cabin 3 at at least one of an upper limit position or a lower limit position.

Referring back to FIG. 2, the vehicle body 2 includes a vehicle body frame. The traveling device 4 includes a pair of left and right front wheels 4F, and a pair of left and right rear wheels 4R. The traveling device 4 includes the pair of left and right front wheels 4F, the pair of left and right rear wheels 4R, a front axle frame 40 supporting the pair of left and right front wheels 4F, and a rear-wheel differential (not illustrated) to which the pair of left and right rear wheels 4R are attached.

The front axle frame 40 is provided at a front portion (the portion located downstream in the direction of arrow A1, such a portion is hereinafter referred to as "front portion A1") of the tractor 1. The pair of left and right front wheels 4F supported by the front axle frame 40 supports a front portion A1 of the vehicle body 2. On the other hand, the rear-wheel differential (not illustrated) is provided at a rear portion (the portion located downstream in the direction of arrow A2, such a portion is hereinafter referred to as "rear portion A2") of the vehicle body 2. The pair of left and right rear wheels 4R attached to the rear-wheel differential (not illustrated) supports a rear portion A2 of the vehicle body 2. That is, the traveling device 4 supports the entire vehicle body 2 using the pair of left and right front wheels 4F and the pair of left and right rear wheels 4R. In the present example embodiment, the front wheels 4F and the rear wheels 4R are tires. The front wheels 4F may be of tires or crawlers. The rear wheels 4R also may be tires or crawlers.

The driving device 5 includes a prime mover 50, a flywheel device 51 to stabilize the output of the prime mover 50, a transmission 52 to change the rotational speed inputted from the prime mover 50 via the flywheel device 51, and a clutch device 53 to switch the input/output from the prime mover 50 to the transmission 52.

The prime mover 50 is a diesel engine, an electric motor, and/or the like. In the present example embodiment, the prime mover 50 is a diesel engine. In the present example embodiment, the prime mover 50 is provided at the front portion A1 of the vehicle body 2.

The flywheel device 51 includes a flywheel (not illustrated) and a flywheel housing 51a in which the flywheel is housed. The flywheel is coupled to the output shaft of the prime mover 50 and is rotatable coaxially with the output shaft of the prime mover 50 inside the flywheel housing 51a.

The transmission 52 is a transmission mechanism (not illustrated) including an input shaft (not illustrated) and an output shaft (not illustrated), and includes a plurality of gears, and a transmission case 52a in which the transmission mechanism is housed. In the present example embodiment, in addition to the transmission mechanism, the rear-wheel differential is also housed in the transmission case 52a. Accordingly, the pair of left and right rear wheels 4R are provided respectively at a left portion (the portion located downstream in the direction of arrow B2, such a portion is hereinafter referred to as "left portion B2") and a right portion (the portion located downstream in the direction of arrow B1, such a portion is hereinafter referred to as "right portion B1") with the rear-wheel differential provided therebetween, at the rear portion A2 of the vehicle body 2.

The clutch device 53 includes a clutch mechanism (not illustrated) including an input portion (not illustrated) and an output portion (not illustrated) and configured to allow/disallow transmission of torque between the input portion and the output portion, and a clutch case 53a in which the clutch mechanism is housed. In this clutch mechanism, the input portion is connected to the flywheel, and the output portion is connected to the input shaft of the transmission 52.

The flywheel housing 51a is coupled to a rear portion A2 of the prime mover 50. The clutch case 53a is coupled to the flywheel housing 51a. The transmission case 52a is coupled to a rear portion A2 of the clutch case 53a.

In the present example embodiment, the flywheel housing 51a, the transmission case 52a, and the clutch case 53a are a portion of a vehicle body frame that is a framework of the vehicle body 2. That is, the flywheel housing 51a, the transmission case 52a, and the clutch case 53a are coupled together, to provide a portion of a vehicle body frame that has high rigidity.

The vehicle body 2 includes a hood 20 covering the prime mover 50. As described above, the prime mover 50 is provided at the front portion A1 of the vehicle body 2. Therefore, the hood 20 covering the prime mover 50 is also provided at the front portion A1 of the vehicle body 2. The vehicle body 2 further includes a pair of fenders 21. In the present example embodiment, each of the pair of fenders 21 is provided to cover a corresponding one of the pair of left and right rear wheels 4R from above, as illustrated in FIGS. 1 to 3.

As illustrated in FIG. 2, a device coupling portion 22 which is, for example, a three-point linkage or the like is provided on a rear end portion (the end portion located downstream in the direction of arrow A2, such a portion is hereinafter referred to as "rear end portion A2") of the vehicle body 2. A working device M (implement) can be detachably attached to the device coupling portion 22. Coupling the working device M to the device coupling portion 22 enables the working vehicle (tractor) 1 to tow the working device M. The working device M is, for example, a cultivator for cultivation, a fertilizer spreader for spreading a fertilizer, an agricultural chemical spreader for spreading an agricultural chemical, a harvester for harvesting crops, a mower for mowing grass and the like, a tedder for tedding grass and the like, a rake for raking grass and the like, or a baler for baling grass and the like. A horizontal control device to keep the working device M horizontal is provided on the rear portion of the vehicle body 2.

As illustrated in FIG. 2, the cabin 3 accommodates an operator's seat 10 and an operation portion (not illustrated).

As illustrated in FIGS. 1 and 2, the cabin 3 includes a floor base portion 30, a plurality of (e.g., four) pillars 31 extending upward from four corners of the floor base portion 30, and a roof 32 supported by the plurality of pillars 31 and provided over the operator's seat 10.

The floor base portion 30 is, for example, made of metal. The floor base portion 30 is sized such that the opposite side portions in the lateral direction (width direction) B overlap the fenders 21 in the vertical direction. Specifically, the floor base portion 30 has a substantially rectangular shape in plan view and includes a pair of bulges 300 which are lower rear portions protruding upward in an arched manner along the fenders 21 in a side view. The pair of bulges 300 are positioned such that they overlap the pair of fenders 21 in the vertical direction. The lower side of each of the pair of bulges 300 is recessed to correspond to the raised upper side such that the fender 21 below is housed in the recess. That is, the fenders 21 covering the upper portions of the rear wheels 4R are mounted on the left and right sides of the lower rear portion of the cabin 3.

Glass panes, door(s), and the like are provided between the plurality of pillars 31, 31 of the cabin 3. Therefore, the operator's seat 10 inside the cabin 3 is covered by the glass panes, the door(s), and the like to be shielded against the weather.

Figure 6:
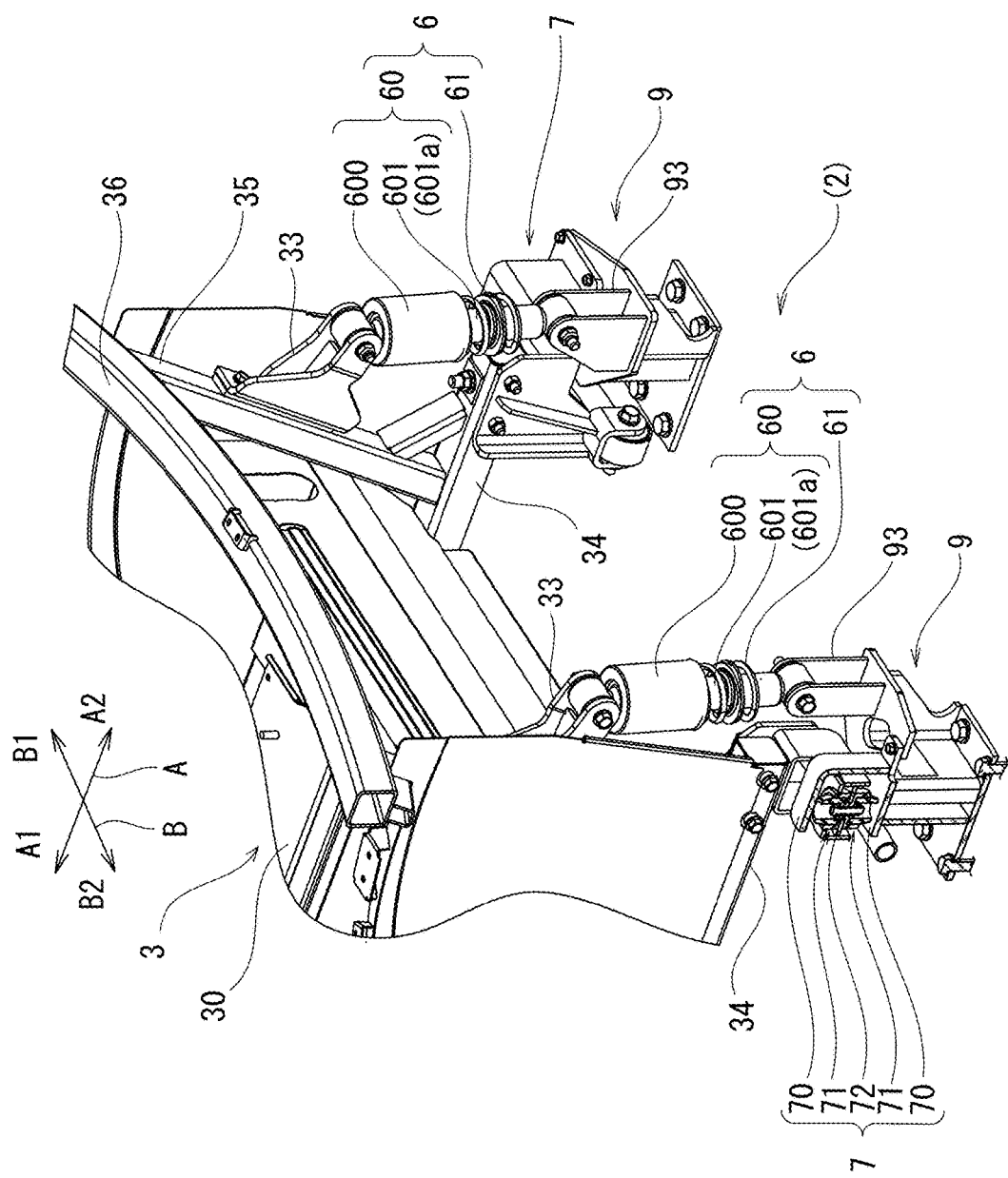
FIG. 6 is a partial enlarged perspective view of a working vehicle according to an example embodiment, including a cross section of a restrictor.

As illustrated in FIG. 6, a first bracket 33 to which the suspension 6 is coupled is mounted at the rear side of the cabin 3 (the rear side located downstream in the direction of arrow A2, such a side is hereinafter referred to as "rear side A2"). Specifically, in the present example embodiment, the cabin 3 includes a pair of longitudinal beam members 34 each of which extends in the forward-rearward direction A, which are spaced apart from each other in the lateral direction (width direction) B, and which support the floor base portion 30, a pair of frames 35 extending upward from respective end portions A2 of the pair of longitudinal beam members 34, and a transverse beam member 36 connecting upper end portions of the pair of frames 35 and extending in the lateral direction (width direction) B. Accordingly, the first bracket 33 is mounted on each of the pair of frames 35. Each of the first brackets 33 extends in the rearward direction A2 from the frame 35.

As illustrated in FIGS. 4 and 5, the tractor 1 according to the present example embodiment includes a cabin support 8 as a feature to support the cabin 3, in addition to the suspension 6. Specifically, the tractor 1 according to the present example embodiment includes a first cabin support 8 to support the front portion A1 of the cabin 3 and a second cabin support 6 to support the rear portion A2 of the cabin 3.

The first cabin support 8 includes a cabin supporting member 80 mounted on the vehicle body 2, and an anti-vibration member 81 supported by the cabin supporting member 80. In the present example embodiment, the cabin supporting member 80 is mounted on the transmission case 52a. Such first cabin supports 8 are provided at two positions, with a space therebetween, in the lateral direction (width direction) B.

The first cabin supports 8 are provided at the two positions symmetrically with respect to the centerline (not illustrated) of the cabin 3 extending in the forward-rearward direction A. Accordingly, the cabin supporting member 80 of one of the first cabin supports 8 extends obliquely upward from the right portion of the front surface of the transmission case 52a. On the other hand, the cabin supporting member 80 of the other of the first cabin supports 8 extends obliquely upward from the front left side surface of the transmission case 52a. In each first cabin support 8, the anti-vibration member 81 is positioned corresponding to the position of the cabin supporting member 80.

In each first cabin support 8, the anti-vibration member 81 is a mount rubber. The mount rubber 81 is a non-foamed urethane rubber. In each of the first cabin supports 8 provided at two positions, the cabin supporting member 80 supports the cabin 3 from below, with the anti-vibration member (mount rubber) 81 therebetween.

In the present example embodiment, the second cabin support 6 supporting the rear portion A2 of the cabin 3 is the aforementioned suspension. Accordingly, the suspension 6 and the restrictor 7 are provided at the rear portion A2 of the cabin 3.

Figure 7:
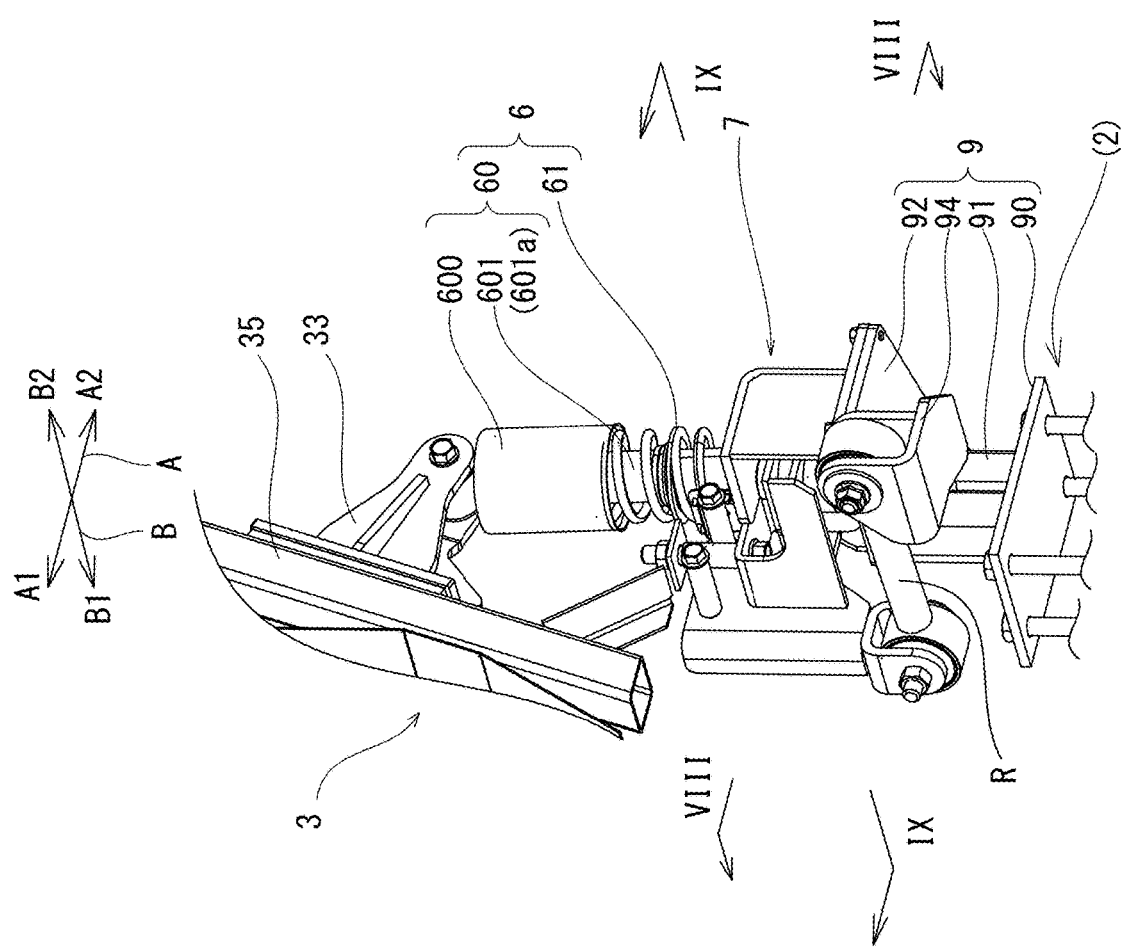
FIG. 7 is an enlarged perspective view of a main portion of a working vehicle according to an example embodiment that includes a suspension and the restrictor as viewed obliquely from below.

The following provides a detailed description. As illustrated in FIGS. 6 and 7, the suspension 6 includes the damper 60. The damper 60 dampens the vertical motion (vibrations in the vertical direction) of the cabin 3 i.e., a so-called shock absorber. The damper 60 includes an extending and retracting structure such as an oil damper, an air damper, or a gas damper (gas spring). In the present example embodiment, an oil damper is used as the damper 60. The shock absorber 60 includes a cylinder portion 600 having a cylindrical shape and a piston rod 601 including a piston (not illustrated) fitted in the cylinder portion 600.

The piston rod 601 includes a rod portion 601a extending outward from a first end of the cylinder portion 600. A first end of the rod portion 601a extends outward from the cylinder portion 600. A second end of the rod portion 601a is connected to the piston inside the cylinder portion 600. Since an oil damper is used as the damper 60 according to the present example embodiment, the damper 60 includes an orifice (not illustrated) inside the cylinder portion 600, and the inside of the cylinder portion 600 is filled with oil.

In this shock absorber 60, a second end of the cylinder portion 600 and the first end of the piston rod 601 (the head end of the rod portion 601a) are coupled to two locations that move toward and away from each other as vibrations occur. That is, the second end of the cylinder portion 600 is coupled to one of the two locations that move toward and away from each other, and the first end of the piston rod 601 is coupled to the other of the two locations that move toward and away from each other.

In the present example embodiment, the suspension 6 includes a coil spring 61 in addition to the shock absorber 60. That is, the suspension 6 according to the present example embodiment is a so-called suspension.

The rod portion 601a is inserted in the coil spring 61. A first end of the coil spring 61 is supported by the rod portion 601a extending from the cylinder portion 600, and a second end of the coil spring 61 is supported at the first end of the cylinder portion 600. In the present example embodiment, the second end of the cylinder portion 600 is coupled to a rear section (the section located downstream in the direction of arrow A2, such a section is hereinafter referred to as "rear section A2") of the cabin 3, and the head end of the rod portion 601a is coupled to the vehicle body 2 (transmission case 52a).

Specifically, the second end of the cylinder portion 600 is coupled via a shaft (no number assigned) extending in the lateral direction (width direction) B to the first bracket 33 mounted on the rear portion of the cabin 3. That is, the cylinder portion 600 is pivotally coupled to the first bracket 33 such that it can rotate about the shaft. The head end of the rod portion 601a is coupled via a shaft (no number assigned) extending in the width direction to a second bracket 93 (described later) provided on the vehicle body 2 (transmission case 52a). That is, a first end (head end) of the rod portion 601a is pivotally coupled to the second bracket 93 such that it can rotate about the shaft.

In the present example embodiment, such suspensions 6 are provided at two positions spaced apart from each other in the width direction of the cabin 3. That is, in the tractor 1, two locations arranged in the width direction (lateral direction) of the cabin 3 are supported by the suspensions 6.

In the tractor 1 according to the present example embodiment, as described above, the front portion A1 of the cabin 3 and the rear portion A2 of the cabin 3 are supported differently from each other. Absorption of vibrations at the rear portion A2 of the cabin 3 supported by the suspensions 6 is greater than at the front portion A1.

That is, with regard to the motion (vibrations) of the cabin 3, since the front portion A1 of the cabin 3 is supported by the solid mount rubber(s) 81, the cabin 3 is allowed to swing about the front portion A1 (the first cabin support 8) of the cabin 3, and vibrations are absorbed at the rear portion A2 of the cabin 3.

The tractor 1 according to the present example embodiment includes the suspensions 6 at two locations as described above. Accordingly, as illustrated in FIG. 6, the tractor 1 according to the present example embodiment includes the restrictors 7 at two positions spaced apart from each other in the lateral direction (width direction) B. The restrictors 7 provided at two locations have the same configuration. Accordingly, the restrictor 7 provided at one of the two locations will be described.

Figure 8:
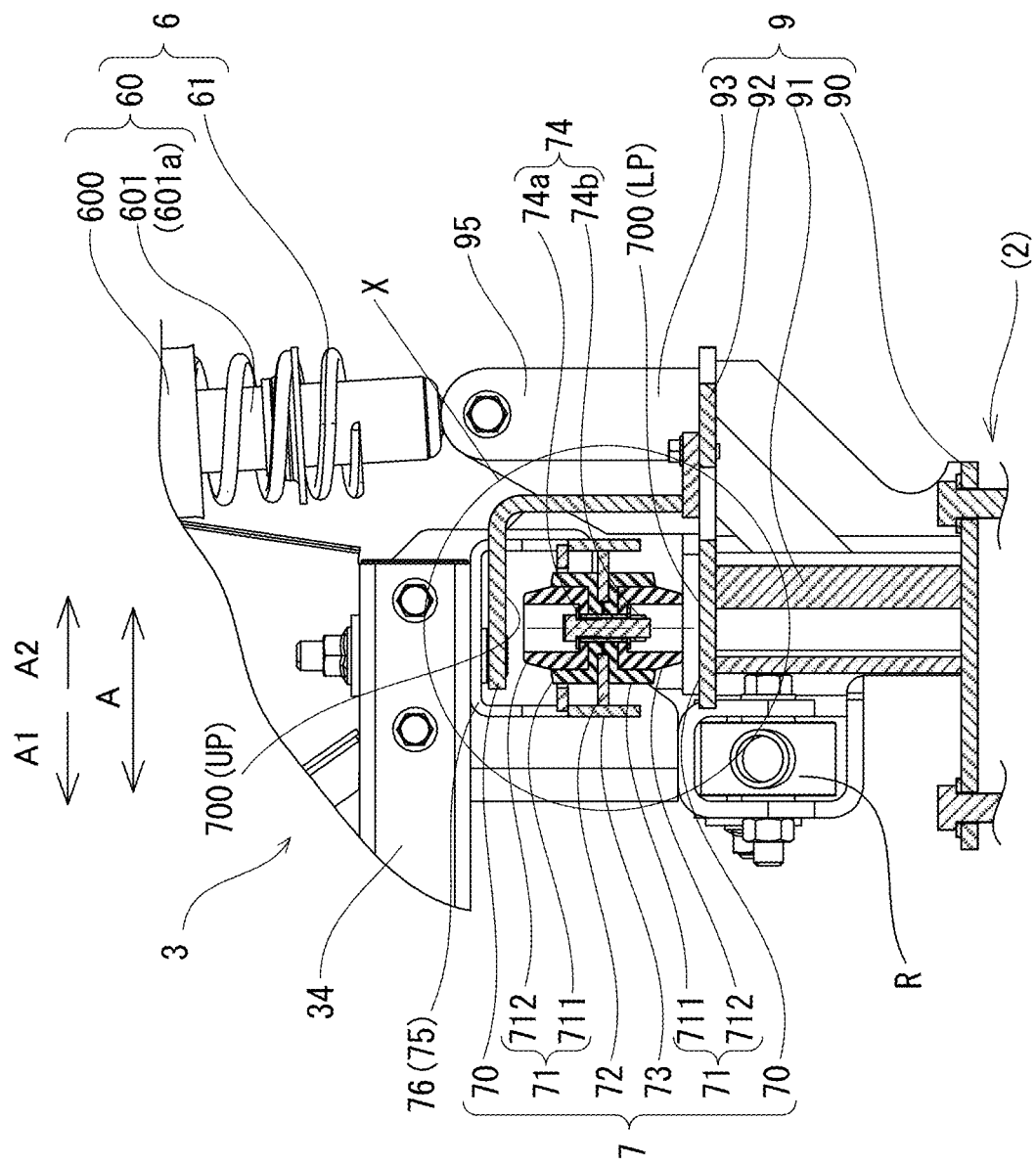
FIG. 8 is a cross-sectional view taken along line VIII-VIII in FIG. 7.
Figure 9:
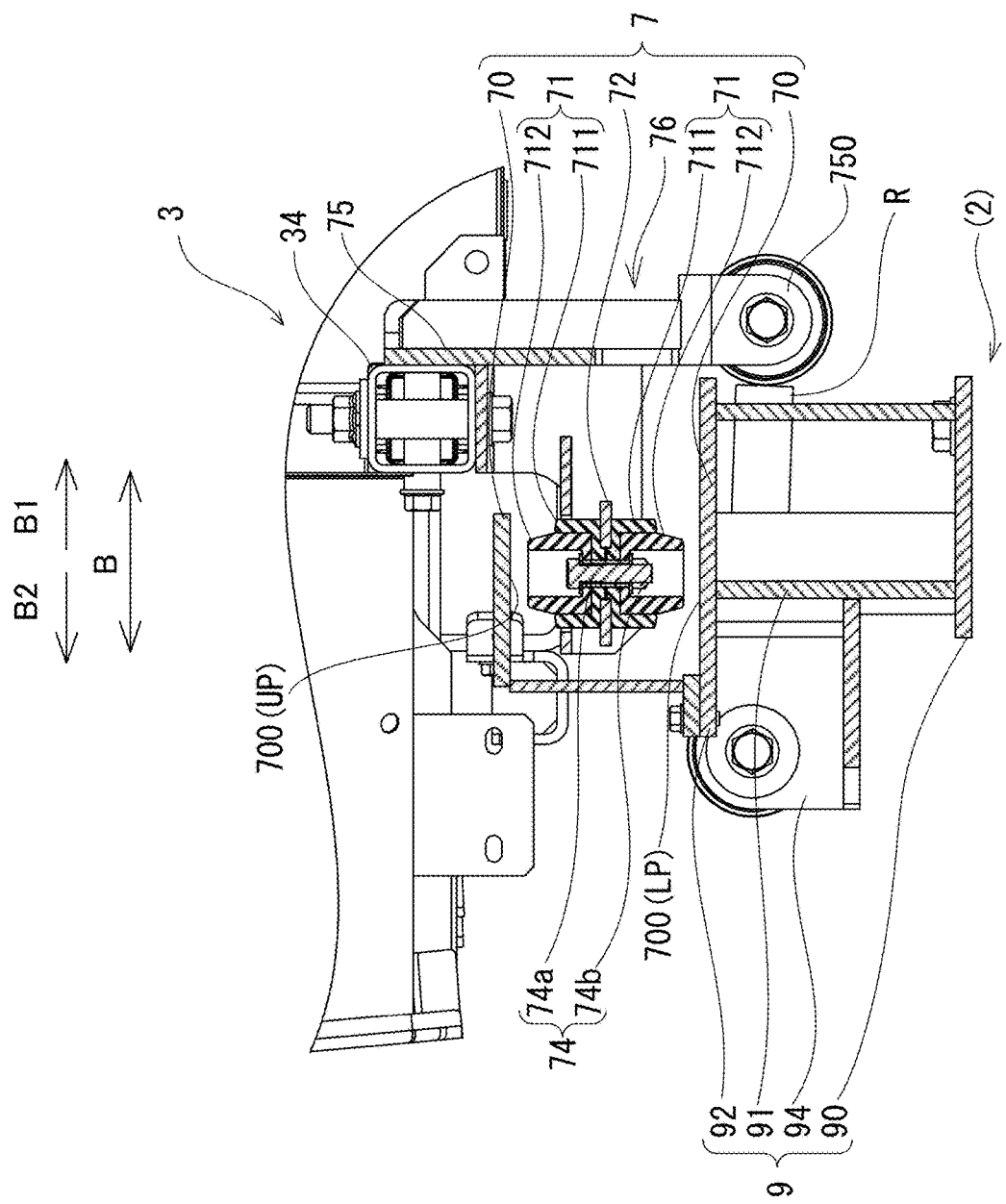
FIG. 9 is a cross-sectional view taken along line IX-IX in FIG. 7.
Figure 10:
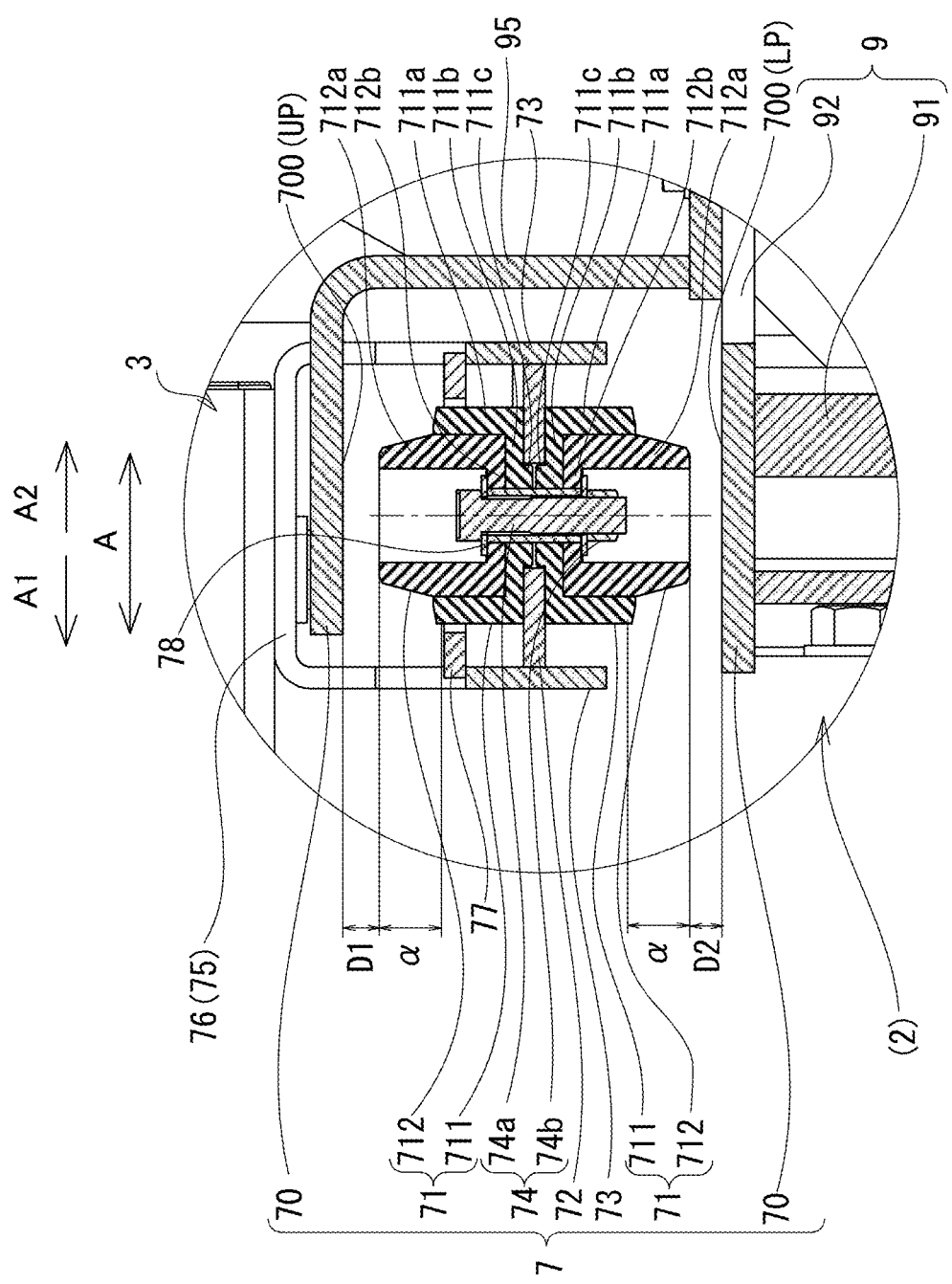
FIG. 10 is an enlarged view of a portion X of FIG. 8.

As illustrated in FIGS. 8 to 10, the restrictor 7 restricts the vertical motion of the cabin 3 at least at one of an upper limit position UP or a lower limit position LP.

Specifically, the restrictor 7 includes a first stopper 70 fixed to the vehicle body 2, and a second stopper 71 fixed to the cabin 3. The second stopper 71 is capable of moving toward and away from the first stopper 70 as the cabin 3 moves vertically. In the present example embodiment, the restrictor 7 further includes a mount portion 72 coupled to the cabin 3, and a fastener 74 to fasten the second stopper(s) 71 to the mount portion 72.

As illustrated in FIG. 10, at least either one of the first stopper 70 and the second stopper 71 includes a first cushion portion 711 and a second cushion portion 712 softer than the first cushion portion 711. The first cushion portion 711 and the second cushion portion 712 are adjacent to each other in a direction intersecting the vertical direction. In the present example embodiment, the first cushion portion 711 and the second cushion portion 712 are made of separate members.

The second cushion portion 712 of the at least either one of the first stopper 70 and the second stopper 71 is configured to come into contact with at least the other of the first stopper 70 and the second stopper 71 before the first cushion portion 711 does. The second cushion portion 712 projects to a greater extent than the first cushion portion 711 toward at least the other of the first stopper 70 and the second stopper 71 that is the target of contact.

One of the first stopper 70 and the second stopper 71 includes a receiving surface 700 which faces the other of the first stopper 70 and the second stopper 71 and which is planar. The other of the first stopper 70 and the second stopper 71 includes the first cushion portion 711 and the second cushion portion 712.

Though a detailed explanation will be given later, in the present example embodiment, the second stopper 71 only includes the first cushion portion 711 and the second cushion portion 712, and the first stopper 70 only includes the receiving surface 700. The second cushion portion 712 projects to a greater extent than the first cushion portion 711 toward the first stopper 70. Accordingly, the second stopper 71 is configured such that the second cushion portion 712 comes into contact with the receiving surface 700 of the first stopper 70 before the first cushion portion 711 does.

A more detailed explanation of the restrictor 7 will be given below. The restrictor 7 according to the present example embodiment restricts the vertical motion of the cabin 3 both at the upper limit position UP and the lower limit position LP. Accordingly, the restrictor 7 includes a pair of first stoppers 70 and a pair of second stoppers 71.

A pair of the first stoppers 70 are displaced from each other at least in the vertical direction. In the present example embodiment, the pair of first stoppers 70 are provided to face each other with a space therebetween in the vertical direction.

More specifically, the gap D1, D2 between a first stopper 70 and a corresponding second stopper 71 is a margin for movement of the second stopper 71. In the present example embodiment, the pair of second stoppers 71 are provided between the pair of first stoppers 70. The pair of second stoppers 71 are provided symmetrically in the vertical direction. The distance between the pair of first stoppers 70 is set such that, in a case where the boundary (plane) with respect to which the pair of second stoppers 71 are provided symmetrically is located at the midpoint between the pair of first stoppers 70 (hereinafter referred to as "reference position of the second stoppers 71"), the gap D1 between one of the first stoppers 70 and one of the second stoppers 71 is the same as, or substantially the same as, the gap D2 between the other of the first stoppers 70 and the other of the second stoppers 71.

The gaps D1 and D2 each between a first stopper 70 and a corresponding second stopper 71 are a margin for movement of the cabin 3. That is, in a case where the boundary (plane) with respect to which the pair of second stoppers 71 are provided symmetrically is located at the reference position of the second stoppers 71, the gap D1 between one of the first stoppers 70 and one of the second stoppers 71 is a margin for upward movement of the cabin 3, and the gap D2 between the other of the first stoppers 70 and the other of the second stoppers 71 is a margin for downward movement of the cabin 3.

This margin for movement of the cabin 3 (the sum of the margin D1 for upward movement and the margin D2 for downward movement) is set such that the margin is equal to or less than the maximum amplitude that can be dampened by the suspension 6 (within the range of the maximum stroke of the shock absorber 60).

In the present example embodiment, each second stopper 71 includes a first cushion portion 711 and a second cushion portion 712. Therefore, the amount of deformation (compressive deformation amount) a of the first cushion portion 711 and the second cushion portion 712 is added to the above-mentioned margins D1 and D2 for movement, and the total is a margin within which the cabin 3 is movable (maximum amplitude).

In the present example embodiment, each first stopper 70 is fixed to the transmission case 52a which is a portion of the vehicle body frame of the vehicle body 2. More specifically, the first stopper 70 is supported by a support base 9 fixed to the transmission case 52a.

As illustrated in FIGS. 8 and 9, the support base 9 includes a base portion 90, a leg portion 91 extending upward from the base portion 90, and a supporting portion 92 provided on the leg portion 91. Both the base portion 90 and the supporting portion 92 are plates, and they face each other in the vertical direction, with the leg portion 91 interposed therebetween. In the present example embodiment, the second bracket 93, to which the suspension 6 is coupled, is connected to the support base 9 (see FIG. 8). The second bracket 93 extends upward from the supporting portion 92. A first rod coupling portion 94, to which a lateral rod R is coupled, is connected to the support base 9. In the present example embodiment, the first rod coupling portion 94 is connected to the leg portion 91.

As illustrated in FIG. 10, a distance keeper 95 to keep the distance between the pair of first stoppers 70 at a fixed distance (a distance within which the pair of second stoppers 71 can be provided and which ensures the margin for movement of the second stoppers 71) is mounted on the supporting portion 92 of the support base 9. In the present example embodiment, one of the first stoppers 70 is integral with the distance keeper 95. Specifically, one of the first stoppers 70 and the distance keeper 95 are formed by bending a metal plate into an L shape (a shape in which two sides bordering on a ridge line define a right angle or a substantially right angle). That is, one of the two sides defining a right angle or a substantially right angle (the side extending in the horizontal direction) is the first stopper 70, and the other of the two sides defining the right angle or the substantially right angle (the side extending in the vertical direction) is the distance keeper 95. The distance keeper 95 is fixed (fastened with bolt(s)) to the supporting portion 92 in an upright position on the supporting portion 92.

One (the upper one) of the first stoppers 70 includes the receiving surface 700 facing down and having a planar shape. On the other hand, the other (the lower one) of the first stoppers 70 includes the receiving surface 700 facing up and having a planar shape. In the present example embodiment, the supporting portion 92 of the support base 9 is in the form of a plate, and therefore the supporting portion 92 functions also as the other of the first stoppers 70. Accordingly, the upper surface of the supporting portion 92 is the receiving surface 700. Since one of the first stoppers 70 is fixed to the support base 9 (supporting portion 92) via the distance keeper 95, the pair of first stoppers 70 face each other in the vertical direction with their receiving surfaces 700 facing each other.

The mount portion 72 includes a planar portion (no number assigned) where the second stopper 71 is provided. The planar portion faces up or down. That is, the planar portion is provided such that it faces at least the first stopper 70. In the present example embodiment, the mount portion 72 is in the form of a plate, and includes such planar portions on its both surfaces in the vertical direction. In the present example embodiment, since the mount portion 72 is in the form of a plate, a reinforcement portion 73 to reinforce the mount portion 72 is provided. More particularly, the restrictor 7 according to the present example embodiment includes a mounting member 76 that includes the mount portion 72. The mounting member 76 includes a coupling portion 75 coupled to the cabin 3, the mount portion 72 in the form of a plate extending from the coupling portion 75 in a direction orthogonal to the vertical direction, and a pair of reinforcement portions 73 reinforcing the mount portion 72.

In the present example embodiment, as illustrated in FIG. 9, the coupling portion 75 is fixed to the bottom surface of the cabin 3. A second rod coupling portion 750, to which the lateral rod R is coupled, is connected to a lower end of the coupling portion 75. The second rod coupling portion 750 is provided at a position that is slightly lower than the first rod coupling portion 94 in the vertical direction. The lateral rod R, which is pivoted at its opposite ends to the first rod coupling portion 94 and the second rod coupling portion 750, is positioned such that the lateral rod R is slightly inclined downward with increasing distance from the first rod coupling portion 94 and decreasing distance to the second rod coupling portion 750. Note that the lateral rod R suppresses vibrations (rolling) of the cabin 3 by changing its position between the above-mentioned position in which the lateral rod R is slightly inclined downward and a position in which the lateral rod R extends in the horizontal direction.

Accordingly, as illustrated in FIG. 10, the mount portion 72 is coupled directly or indirectly to the coupling portion 75. In the present example embodiment, the pair of reinforcement portions 73 extend outward in the lateral direction B from the coupling portion 75 and are coupled to the opposite ends of the mount portion 72 in the forward-rearward direction A. With this, the mount portion 72 and the pair of reinforcement portions 73 together define a cross-sectional shape H, and the mount portion 72 is coupled via the reinforcement portions 73 to the coupling portion 75. A through hole (no number assigned) extending in the vertical direction is provided in the mount portion 72 (planar portion). The position of the through hole of the mount portion 72 is based on the position of the second stopper 71.

In the present example embodiment, the mounting member 76 includes a guide portion 77 spaced apart from the mount portion 72 in the vertical direction. The guide portion 77 is in the form of a plate, and includes a through hole (no number assigned) having a diameter that is large enough for the first cushion portion 711 and the second cushion portion 712 to be movably inserted. In the present example embodiment, the through hole of the guide portion 77 preferably has a diameter that is larger than the outer diameter of the first cushion portion 711, based on the first cushion portion 711. The guide portion 77 is fixed to the pair of reinforcement portions 73 such that the first cushion portion 711 is movably inserted through the through hole.

In the present example embodiment, the guide portion 77 is provided such that it corresponds to one of the second stoppers 71. More specifically, the guide portion 77 faces one (the upper one) of the first stoppers 70 with a space therebetween such that the guide portion 77 is fixed directly or indirectly to the cabin 3 (in the present example embodiment, to the reinforcement portion 73). Therefore, the guide portion 77 functions as a metal stopper provided on the ascending side. That is, the guide portion 77 prevents, at an early stage, the cabin 3 from ascending more than the stroke of D1+α when a large load that cannot be absorbed by deformation of the first cushion portion 711 is applied to the cabin 3.

The first cushion portion 711 and the second cushion portion 712 absorb shock caused by contact (collision) with the first stopper 70. That is, the term "cushion" included in the names of the first cushion portion 711 and the second cushion portion 712 refers to "an elastic object that supports another object" or "an object to reduce shocks". Both the first cushion portion 711 and the second cushion portion 712 have the functions meant by the term "cushion".

The second cushion portion 712 is softer than the first cushion portion 711. The term "soft" refers to a low hardness compared to something, and indicates that the hardness of the second cushion portion 712 is lower than that of the first cushion portion 711. A modulus of elasticity (Young's modulus) is known as a parameter representing the elastic property of an elastic object. In the present example embodiment, the meaning of "the second cushion portion 712 is softer than the first cushion portion 711" is that the modulus of elasticity (Young's modulus) of the second cushion portion 712 is less than that of the first cushion portion 711.

The first cushion portion 711 and the second cushion portion 712 are elastic bodies. In the present example embodiment, the first cushion portion 711 is a non-foamed urethane rubber. On the other hand, the second cushion portion 712 is a foamed urethane rubber. In the present example embodiment, though both the first cushion portion 711 and the second cushion portion 712 are formed of urethane, they have different degrees of softness depending on whether it is foamed or not. That is, by foaming a urethane rubber, the second cushion portion 712 is formed to be softer than the first cushion portion 711 made of a non-foamed urethane rubber.

One of the first cushion portion 711 and the second cushion portion 712 includes a tubular portion 711a. The other of the first cushion portion 711 and the second cushion portion 712 is fitted in the tubular portion 711a of the one of the first cushion portion 711 and the second cushion portion 712. The other of the first cushion portion 711 and the second cushion portion 712 is not bonded to the inner circumferential surface of the tubular portion 711a of the one of the first cushion portion 711 and the second cushion portion 712. This enables compressive deformation and returning to the original shape of each of the first cushion portion 711 and the second cushion portion 712 independently, depending on whether a load is applied in the vertical direction or not.

In the present example embodiment, the first cushion portion 711 includes the tubular portion 711a, and the second cushion portion 712 is fitted in the tubular portion 711a of the first cushion portion 711. Specifically, the second cushion portion 712 is fitted in the tubular portion 711a of the first cushion portion 711 concentrically or substantially concentrically.

More specifically, the first cushion portion 711 includes a first tubular portion 711a, which is the tubular portion 711a and includes a distal end portion and a proximal end portion, and a first base portion 711b connected to the proximal end portion of the first tubular portion 711a. The first base portion 711b extends from an inner circumference of the first tubular portion 711a toward the center of an inner hole of the first tubular portion 711a. In the present example embodiment, the first cushion portion 711 further includes a positioning convex portion 711c provided continuously on an outer surface of the first base portion 711b. The positioning convex portion 711c performs positioning by being fitted in the through hole of the mount portion 72.

In the present example embodiment, the first tubular portion 711a is in the form of a cylinder with a perfect circle, for example. A through hole (no number assigned) is provided in the first base portion 711b and the positioning convex portion 711c. The center of the through hole of the first base portion 711b and the positioning convex portion 711c coincides with the center of the inner hole of the first tubular portion 711a. The through hole of the first base portion 711b and the positioning convex portion 711c has a diameter that is large enough for a threaded portion of a bolt 74a (described later) to be inserted through it. In the present example embodiment, the diameter of the through hole of the first base portion 711b and the positioning convex portion 711c corresponds to an outer diameter of a collar 78 such that the bolt 74a can be inserted in the through hole such that the bolt 74a extends through the tubular collar 78.

Furthermore, the second cushion portion 712 includes a second tubular portion 712a including a distal end and a proximal end. The proximal end portion of the second tubular portion 712a is fitted in the first tubular portion 711a concentrically or substantially concentrically. In the present example embodiment, the second tubular portion 712a is in the form of a cylinder with a perfect circle so as to correspond to the shape of the first tubular portion 711a, for example. The second tubular portion 712a has an outer diameter that matches the inner diameter of the first tubular portion 711a such that, when the second tubular portion 712a is fitted in the first tubular portion 711a as described above, its outer circumferential surface is in tight contact with the inner circumferential surface of the first tubular portion 711a.

The distal end portion of the second cushion portion 712 projects from the first cushion portion 711 toward at least the other of the first stopper 70 and the second stopper 71 that is the target of contact. The portion of the second cushion portion 712 that projects from the first cushion portion 711 has a cross-sectional area that decreases in a direction from the proximal end toward the distal end. In the present example embodiment, the distal end portion of the second cushion portion 712 projects from the first cushion portion 711 toward the first stopper 70 that is the target of contact.

In the present example embodiment, the second cushion portion 712 includes the second tubular portion 712a, and the second tubular portion 712a projects to a greater extent than the first cushion portion 711 (the first tubular portion 711a). Therefore, the outer diameter of the second tubular portion 712a decreases from the proximal end side toward the distal end portion.

More specifically, the first tubular portion 711a and the second tubular portion 712a each have a cylindrical shape, and each of the inner holes of the first tubular portion 711a and the second tubular portion 712a has the same diameter throughout its entire length. Accordingly, the distal end portion of the second tubular portion 712a (the portion that projects from the first cushion portion 711) has a shape that looks like a truncated cone because its outer diameter decreases from the proximal end toward the distal end.

One of the pair of second stoppers 71 is positioned such that its first cushion portion 711 and its second cushion portion 712 are oriented toward one of the pair of first stoppers 70 from below. On the other hand, the other of the pair of second stoppers 71 is positioned such that its first cushion portion 711 and its second cushion portion 712 are oriented toward the other of the pair of first stoppers 70 from above.

The second cushion portion 712 includes a second base portion 712b connected to the proximal end portion of the second tubular portion 712a, and the second base portion 712b extends from an inner circumference of the second tubular portion 712a toward the center of an inner hole of the second tubular portion 712a. In the present example embodiment, the center of the through hole of the second base portion 712b of the second cushion portion 712 coincides with the center of the inner hole of the second tubular portion 712a. The through hole of the second base portion 712b has a diameter that is large enough for the threaded portion of the bolt 74a to be inserted through it. In the present example embodiment, the diameter of the through hole of the second base portion 712b corresponds to the outer diameter of the collar 78 such that the bolt 74a inserted through the collar 78 can be inserted in the through hole, as described above.

The second stopper 71 is provided such that the first base portion 711b of the first cushion portion 711 is placed on the mount portion 72. With this, the first base portions 711b of the first cushion portions 711 of the pair of second stoppers 71 sandwich the mount portion 72.

The fastener 74 fastens the pair of second stoppers 71 and the mount portion 72 such that the fastener 74 extends through the first base portion 711b and the second base portion 712b of each of the pair of second stoppers 71 and through the mount portion 72. The fastener 74 may be a rivet, a bolt, a nut, etc. In the present example embodiment, the bolt 74a and a nut 74b are used. Accordingly, the threaded portion (no number assigned) of the bolt 74a extends through the through hole (a continuous through hole) of each of the first base portion 711b, the positioning convex portion 711c, the second base portion 712b of each of the pair of second stoppers 71 and the mount portion 72.

In the present example embodiment, since the threaded portion extends through the collar 78 having a tubular shape as described above, it extends through the through hole (a continuous through hole) of each of the first base portion 711b, the positioning convex portion 711c, the second base portion 712b of each of the pair of second stoppers 71 and the mount portion 72.

The head portion (no number assigned) of the bolt 74a is located inside the first cushion portion 711 (inside the first tubular portion 711a) of the second stopper 71 that is one of the pair of second stoppers 71, and the nut 74b is located inside the first cushion portion 711 (inside the first tubular portion 711a) of the second stopper 71 that is the other thereof.

The working vehicle 1 (the tractor 1) according to the present example embodiment has the configuration described above and, when traveling on a bad path or a non-leveled land, travels while tilting the vehicle body 2 (while allowing it to move up and down) in accordance with the terrain of the land. Accordingly, the cabin 3 provided on the vehicle body 2 also moves up and down (vibrates). However, since the cabin 3 is supported by the suspension(s) 6, the vertical motion (vibrations) of the traveling vehicle is absorbed by the damper(s) 60 of the suspension(s) 6, making the vertical motion of the cabin 3 less violent than that of the traveling vehicle.

Though it is possible to dampen the vertical motion (vibrations) of the cabin 3 using the damper(s) 60 of the suspension(s) 6 as described above, relying solely on the suspension(s) 6 to support the cabin 3 will make the range of the vertical motion (the amplitude of the vibrations) of the cabin 3 unsteady, resulting in an uncomfortable ride. In contrast to this, since the working vehicle 1 according to the present example embodiment includes the restrictor 7 configured to restrict the vertical motion of the cabin 3 at least at either one of the upper limit position UP and the lower limit position LP, the range of the vertical motion of the cabin 3 is restricted to a definite range.

If the position of the cabin 3 that moves up and down (vibrates) is forcibly restricted, a force of impact will act on the cabin 3 at the time of restriction. In this regard, according to the present example embodiment, the restrictor 7 includes first stopper(s) 70 fixed to the vehicle body 2, and second stopper(s) 71 fixed to the cabin 3 and configured to move toward and away from the first stopper 70 in as the cabin 3 moves vertically, the second stopper 71 includes the first cushion portion 711 and the second cushion portion 712 softer than the first cushion portion 711, the first cushion portion 711 and the second cushion portion 712 being adjacent to each other in a direction intersecting the vertical direction, and the second cushion portion 712 is configured to come into contact with the first stopper 70 before the first cushion portion 711 does. Therefore, shock absorption at the time of contact (collision) of the second stopper 71 with the first stopper 70 is not monotonous, and the shock to the cabin 3 is suppressed.

Working vehicles 1 according to one or more example embodiments have been discussed. Example embodiments of the present invention provide working vehicles 1 described in the following items.

(Item 1) A working vehicle 1 including a vehicle body 2, a cabin 3, and a restrictor 7 to restrict vertical motion of the cabin 3 at at least one of an upper limit position UP or a lower limit position LP, wherein the restrictor 7 includes a first stopper 70 and a second stopper 71 movable toward and away from the first stopper 70 as the cabin 3 moves vertically, at least one of the first stopper 70 or the second stopper 71 includes a first cushion portion 711 and a second cushion portion 712 softer than the first cushion portion 711, the first cushion portion 711 and the second cushion portion 712 being adjacent to each other in a direction intersecting a vertical direction, and the second cushion portion 712 is contactable with the first stopper 70 or the second stopper 71 before the first cushion portion 711 as the cabin 3 moves vertically.

With the working vehicle 1 according to item 1, during travel on an undulating ground, the vehicle body 2 travels while tilting (while moving up and down) according to the profile of the ground. Accordingly, the cabin 3 provided on the vehicle body 2 also moves up and down. In a case that the working vehicle 1 includes the suspension 6, since the cabin 3 is supported by the suspension 6, the vertical motion (vibrations) of the traveling vehicle is absorbed by the damper 60 of the suspension 6, thus decreasing the vertical motion of the cabin 3 compared to that of the traveling vehicle.

With the working vehicle 1 according to one or more example embodiments of the present invention, regardless of whether the suspension 6 is provided or not, in a situation where the cabin 3 moves up and down over the vehicle body 2 (the cabin 3 oscillates over the vehicle body 2), the range of movement of the cabin 3 in the vertical direction is restricted by the restrictor 7. That is, at least one of the upper limit or the lower limit of the vertical motion of the cabin 3 is determined by the restrictor 7. The restriction on the range of the vertical motion of the cabin 3 is achieved by contact (collision) of the first stopper 70, which is fixed to the traveling vehicle, and the second stopper 71, which is fixed to the cabin 3, resulting from the vertical motion of the cabin 3.

With the working vehicle 1 including the above configuration, as described above, when the contact (collision) of the first stopper 70 and the second stopper 71 is about to occur, the second cushion portion 712 comes into contact with and is compressed by the first stopper 70 or the second stopper 71 (which is to be contacted by the second cushion portion 712) before the first cushion portion 711 does, and then the first cushion portion 711 comes into contact with and is compressed by the first stopper 70 or the second stopper 71 (which is to be contacted by the first stopper 70). That is, since the first cushion portion 711 and the second cushion portion 712 are adjacent to each other in a direction intersecting the vertical direction and the second cushion portion 712 comes into contact with the first stopper 70 or the second stopper 71 before the first cushion portion 711 does, the pressure (compressive force) in the vertical direction acts first on the soft second cushion portion 712 and then on the first cushion portion 711, instead of acting simultaneously on the first cushion portion 711 and the second cushion portion 712.

Therefore, when the contact (collision) of the first stopper 70 and the second stopper 71 is about to occur, the first cushion portion 711 absorbs shocks after the second cushion portion 712 absorbs shocks. Since the second cushion portion 712 is softer than the first cushion portion 711, a transition occurs from a state in which shock absorption rate is high to a state in which shock absorption rate is low, and the shocks acting on the cabin 3 are absorbed in a gradually decreasing manner. Therefore, it is possible to prevent or reduce the feeling of a shock. Moreover, since the first cushion portion 711 and the second cushion portion 712 are adjacent to each other in a direction intersecting the vertical direction, the second cushion portion 712 is also compressed when the first cushion portion 711 is compressed. This improves the shock absorption rate.

(Item 2) The working vehicle 1 according to item 1, wherein the second cushion portion 712 projects toward the first stopper 70 or the second stopper 71 to a greater extent than the first cushion portion 711.

With the working vehicle 1 of item 2, since the second cushion portion 712 projects toward the first stopper 70 or the second stopper 71 to a greater extent than the first cushion portion 711, the second cushion portion 712 includes a portion located closer to the target of contact than the first cushion portion 711 is. Therefore, when the first stopper 70 and the second stopper 71 are located relatively close to each other, the second cushion portion 712 comes into contact with and is compressed by the target of contact before the first cushion portion 711 does.

(Item 3) The working vehicle 1 according to item 1 or 2, wherein one of the first stopper 70 and the second stopper 71 includes a receiving surface 700 which is planar, the other of the first stopper 70 and the second stopper 71 includes the first cushion portion 711 and the second cushion portion 712, and the first cushion portion 711 and the second cushion portion 712 are oriented toward the receiving surface 700.

With the working vehicle 1 of item 3, one of the first stopper 70 and the second stopper 71 includes the receiving surface 700 which is planar, the other of the first stopper 70 and the second stopper 71 includes the first cushion portion 711 and the second cushion portion 712, and the first cushion portion 711 and the second cushion portion 712 are oriented toward the receiving surface 700. Therefore, the second cushion portion 712 includes a portion located closer to the receiving surface 700 (the target of contact) than the first cushion portion 711 is. Therefore, merely by using a receiving surface 700 (the target of contact) that has a planar shape (i.e., without having to make the structure of the target of contact complex), it is possible to achieve a configuration in which, when the first stopper 70 and the second stopper 71 are located relatively close to each other, the second cushion portion 712 comes into contact with and is compressed by the target of contact (receiving surface 700) before the first cushion portion 711 does.

(Item 4) The working vehicle 1 according to any of items 1 to 3, wherein one of the first cushion portion 711 and the second cushion portion 712 includes a tubular portion 711a, and the other of the first cushion portion 711 and the second cushion portion 712 is fitted in the tubular portion 711a of the one of the first cushion portion 711 and the second cushion portion 712.

With the working vehicle 1 of item 4, one of the first cushion portion 711 and the second cushion portion 712 includes the tubular portion 711a, and the other of the first cushion portion 711 and the second cushion portion 712 is fitted in the tubular portion 711a of the one of the first cushion portion 711 and the second cushion portion 712. Therefore, the first cushion portion 711 and the second cushion portion 712 are positioned relative to each other. Furthermore, since the other of the first cushion portion 711 and the second cushion portion 712 that is fitted in the tubular portion 711a is restricted by the tubular portion 711a of the one of the first cushion portion 711 and the second cushion portion 712, free compressive deformation is prevented. This makes the compression (deformation) of the first cushion portion 711 and the second cushion portion 712 stable, making it possible to stably absorb shocks caused by the vertical motion of the cabin 3.

(Item 5) The working vehicle 1 according to item 4, wherein the first cushion portion 711 includes the tubular portion 711a, and the second cushion portion 712 is fitted in the tubular portion 711a of the first cushion portion 711 concentrically or substantially concentrically.

With the working vehicle 1 of item 5, the first cushion portion 711 includes the tubular portion 711a, and the second cushion portion 712 is fitted in the tubular portion 711a of the first cushion portion 711 concentrically or substantially concentrically. When the second cushion portion 712 is fitted in the tubular portion 711a of the first cushion portion 711 concentrically or substantially concentrically as such, the second cushion portion 712 which is softer than the first cushion portion 711 is restricted by the first cushion portion 711 which is harder than the second cushion portion 712 such that the center axes extending in the vertical direction coincide with each other. This limits free deformation (compressive deformation) of the second cushion portion 712, making it possible to more stably absorb shocks caused by the vertical motion of the cabin 3.

(Item 6) The working vehicle 1 according to item 5, wherein the first cushion portion 711 includes a first tubular portion 711a defining the tubular portion 711a and including a distal end portion and a proximal end portion, and a first base portion 711b connected to the proximal end portion of the first tubular portion 711a, the first base portion 711b extending from an inner circumference of the first tubular portion 711a toward a center of an inner hole of the first tubular portion 711a, and the second cushion portion 712 includes a second tubular portion 712a including a distal end portion and a proximal end portion, and the proximal end portion of the second tubular portion 712a is fitted in the first tubular portion 711a concentrically or substantially concentrically.

With the working vehicle 1 of item 6, since the second tubular portion 712a of the second cushion portion 712 is fitted in the first tubular portion 711a of the first cushion portion 711 concentrically or substantially concentrically, the second tubular portion 712a of the second cushion portion 712 which is softer than the first cushion portion 711 is restricted by the first tubular portion 711a of the first cushion portion 711 which is harder than the second tubular portion 712a such that the central axes extending in the vertical direction coincide with each other.

This limits deformation (swelling) of the second tubular portion 712a of the second cushion portion 712 outward in the radial direction when the second tubular portion 712a is in contact with and therefore compressed by the target of contact, making it possible to more stably absorb shocks caused by the vertical motion of the cabin 3. Moreover, the second tubular portion 712a of the second cushion portion 712 is not restricted at its inner hole, and is therefore allowed to deform (elastic deformation) when compressed. Therefore, the absorption of shocks acting on the cabin 3 is ensured.

(Item 7) The working vehicle 1 according to item 6, wherein a distal end portion of the second cushion portion 712 projects from the first cushion portion 711 toward at least the other of the first stopper 70 and the second stopper 71 that is to be contacted by the distal end portion of the second cushion portion 712, and a portion of the second cushion portion 712 that projects from the first cushion portion 711 has a cross-sectional area that decreases in a direction from a proximal end toward a distal end.

With the working vehicle 1 of item 7, the distal end portion of the second cushion portion 712 projects from the first cushion portion 711 toward at least the other of the first stopper 70 and the second stopper 71 that is to be contacted by the distal end portion of the second cushion portion 712. The portion of the second cushion portion 712 that projects from the first cushion portion 711 has a cross-sectional area that decreases in a direction from the proximal end toward the distal end.

With the above configuration, since the portion that has a smaller cross-sectional area has lower rigidity, the distal end portion having a smaller cross-sectional area is more susceptible to compressive deformation when the second cushion portion 712 comes into contact with and is compressed by the target of contact. That is, the second cushion portion 712 undergoes compressive deformation sequentially from the distal end toward the proximal end. This eliminates or reduces the likelihood that the shocks acting on the cabin 3 will be absorbed instantaneously and monotonously.

(Item 8) The working vehicle 1 according to item 7, wherein the restrictor 7 includes a pair of the first stoppers 70, 70 and a pair of the second stoppers 71, 71, the pair of first stoppers 70, 70 are displaced from each other at least in the vertical direction, one of the pair of second stoppers 71, 71 is positioned such that the first cushion portion 711 and the second cushion portion 712 thereof are oriented toward one of the pair of first stoppers 70, 70 from below, and the other of the pair of second stoppers 71, 71 is positioned such that the first cushion portion 711 and the second cushion portion 712 thereof are oriented toward the other of the pair of first stoppers 70, 70 from above.

With the working vehicle 1 of item 8, since one of the second stoppers 71 is oriented toward one of the first stoppers 70 from below, the upper limit position UP of the cabin 3 is determined by the contact of the one of the second stoppers 71 with the one of the first stoppers 70. On the other hand, since the other of the second stoppers 71 is oriented toward the other of the first stoppers 70 from above, the lower limit position LP of the cabin 3 is determined by the contact of the other of the second stoppers 71 with the other of the first stoppers 70. Although there are cases in which each first stopper 70 and a corresponding second stopper 71 contact (collide) with each other when the cabin 3 is at the lower limit position LP or the upper limit position UP, since the second cushion portion 712 comes into contact with the target of contact before the first cushion portion 711 does and then the first cushion portion 711 comes into contact with the target of contact, the shocks caused by the vertical motion of the cabin 3 at the lower limit position LP and the upper limit position UP are mitigated.

(Item 9) The working vehicle 1 according to item 8, wherein the restrictor 7 further includes a mount portion 72 coupled to the cabin 3, and a fastener 74 to fasten the pair of second stoppers 71 to the mount portion 72, each of the pair of second stoppers 71 is configured such that the second cushion portion 712 includes a second base portion 712b connected to the proximal end portion of the second tubular portion 712a, the second base portion 712b extending from an inner circumference of the second tubular portion 712a toward a center of an inner hole of the second tubular portion 712a, the pair of first stoppers 70, 70 face each other with a space therebetween in the vertical direction, the first base portions 711b of the first cushion portions 711 of the pair of second stoppers 71, 71 sandwich the mount portion 72, and the fastener 74 fastens the pair of second stoppers 71, 71 and the mount portion 72 such that the fastener 74 extends through the first base portions 711b and the second base portions 712b of the pair of second stoppers 71, 71 and the mount portion 72.

With the working vehicle 1 of item 9, the pair of second stoppers 71 are fastened by the fastener 74 such that their first base portions 711b sandwich the mount portion 72, and therefore the pair of second stoppers 71 are arranged in a line in the vertical direction. The pair of second stoppers 71 are arranged such that the first cushion portions 711 face each other and the second cushion portions 712 face each other. That is, the pair of second stoppers 71 are provided between the pair of first stoppers 70 facing each other in the vertical direction. Therefore, it is possible to determine the upper limit position UP and the lower limit position LP of the cabin 3 while achieving a compact structure. Moreover, this effect makes it possible to sufficiently mitigate shocks caused by the vertical motion of the cabin 3.

The scope of the present invention is not limited to the example embodiments described above, and modifications and variations can be made as appropriate within the spirit of the present invention.

In the example embodiments described above, the front portion A1 of the cabin 3 is supported by the cabin supporting member 80 and the anti-vibration member 81, and a mount rubber is used as the anti-vibration member 81. However, this does not imply any limitation. For example, the suspension 6 and the restrictor 7 that are similar to those provided at the rear portion A2 of the cabin 3 may be used for the front portion A1 of the cabin 3.

In the example embodiments described above, the shock absorber 60 as a damper, and a suspension including a coil spring, are included in the suspension 6. However, this does not imply any limitation. For example, the suspension 6 may be configured such that a link mechanism (four-bar parallel linkage, etc.) is provided between the vehicle body 2 and the cabin 3 and such that the damper 60 (the shock absorber 60) is connected to the link of the link mechanism to suppress the tilting of the link (vibrations of the cabin 3).

In the example embodiments described above, the first cushion portion 711 and the second cushion portion 712 are caused to have different degrees of softness by being foamed or not. However, this does not imply any limitation. For example, the first cushion portion 711 and the second cushion portion 712 may be caused to have different degrees of hardness (the second cushion portion 712 may be caused to be softer than the first cushion portion 711) by having foam ratios different from each other. Besides the presence or absence of foaming or differences in foam ratios, the first cushion portion 711 and the second cushion portion 712 may be caused to have different degrees of hardness (softness) using the characteristics of their materials.

The first cushion portion 711 and the second cushion portion 712 may be made of the same material or different materials. In a case where the first cushion portion 711 and the second cushion portion 712 are made of the same material, the first cushion portion 711 and the second cushion portion 712 may be integrally molded as portions having different foam ratios. Therefore, although the inner circumferential surface of the first tubular portion 711a and the second cushion portion 712 (the outer circumferential surface of the second tubular portion 712a) are not bonded to each other in the example embodiments described above, they may be bonded to each other. However, for the purpose of ensuring independence in deformation of the first cushion portion 711 and the second cushion portion 712, it is preferable that they are not bonded to each other as in the example embodiments described above.

In the example embodiments described above, both the first tubular portion 711a and the second tubular portion 712a are in the form of a cylinder with a perfect circle such that they are concentric or substantially concentric. However, this does not imply any limitation. One of the first tubular portion 711a and the second tubular portion 712a may have an uneven thickness in the radial direction such that they are not concentric.

In the example embodiments described above, the tubular portion (the first tubular portion 711a, the second tubular portion 712a) of each of the first and second cushion portions 711 and 712 is in the form of a cylinder with a perfect circle. However, this does not imply any limitation. For example, when the tubular portions 711a and 712a are provided, each tubular portion 711a, 712a may have a polygonal tubular shape such as a quadrangular tubular shape.

Figure 11:
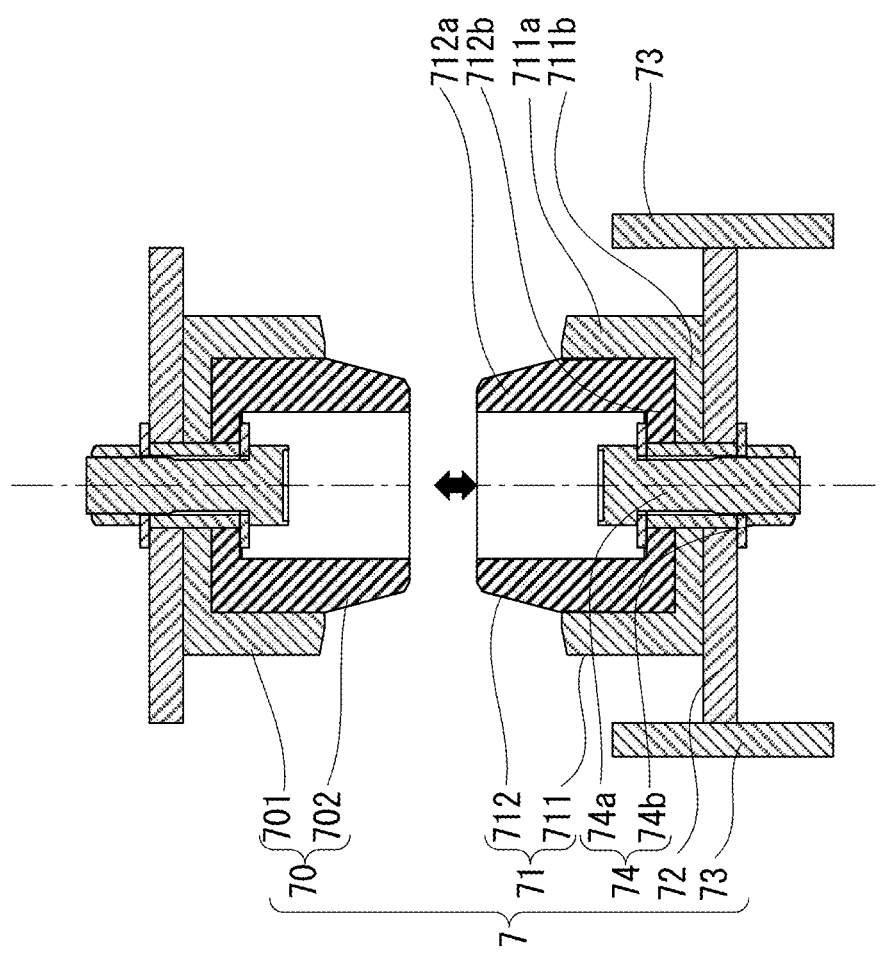
FIG. 11 is a schematic cross-sectional view of a restrictor of a working vehicle according to another example embodiment of the present invention.
Figure 12:
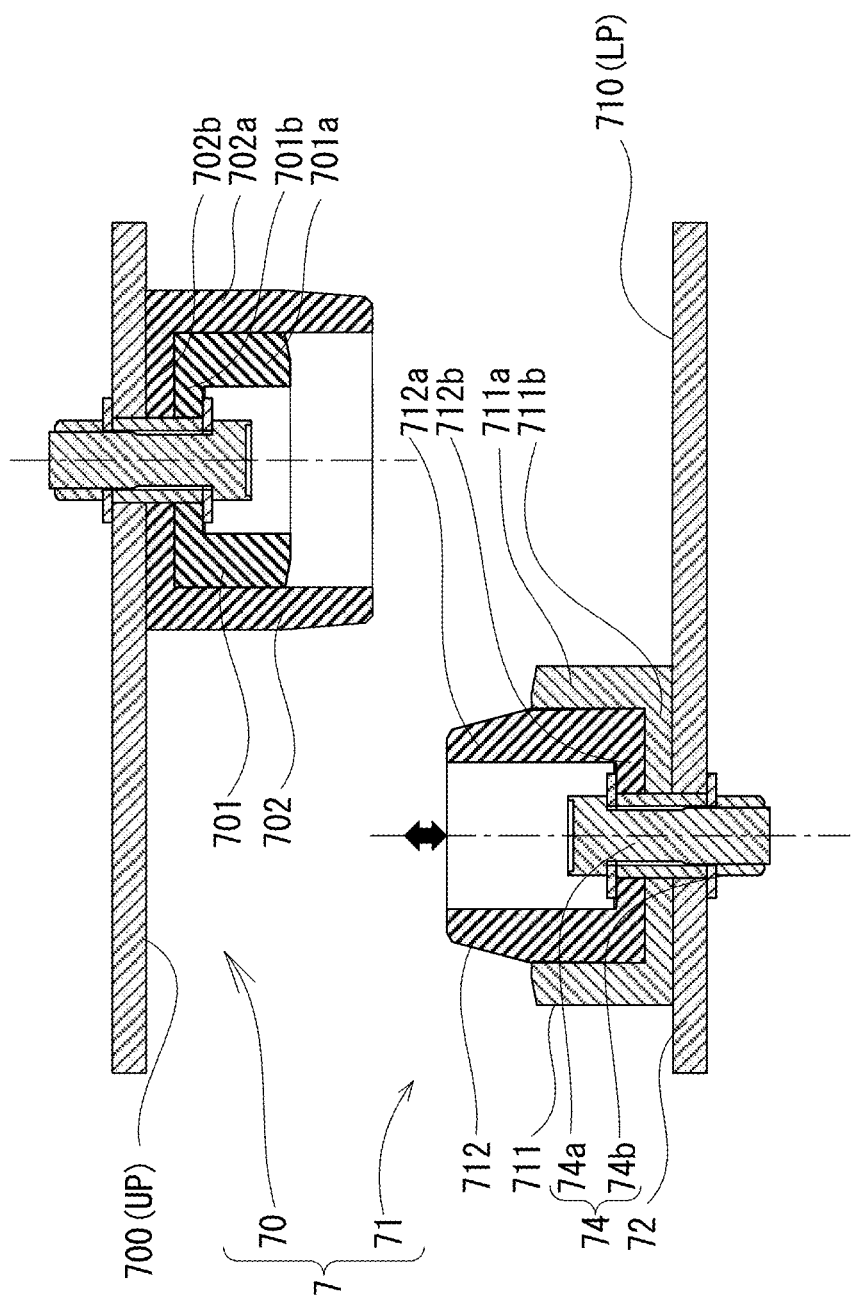
FIG. 12 is a schematic cross-sectional view of a restrictor of a working vehicle according to still another example embodiment of the present invention.

In the example embodiments described above, the first stopper 70 includes the receiving surface 700 having a planar shape, and the second stopper 71 includes the first cushion portion 711 and the second cushion portion 712. However, this does not imply any limitation. For example, as illustrated in FIG. 11, both the first stopper 70 and the second stopper 71 may include the first cushion portion 701, 711 and the second cushion portion 702, 712. Additionally or alternatively, as illustrated in FIG. 12, the first stopper 70 and the second stopper 71 may each include the receiving surface 700, 710 having a planar shape and, include the first cushion portion 701, 711 and the second cushion portion 702, 712. In either case, it is a precondition that the second cushion portion 702, 712 is configured to come into contact with the target of contact before the first cushion portion 701, 711 does. Additionally or alternatively, when both the first stopper 70 and the second stopper 71 include the first cushion portion 701, 711 and the second cushion portion 702, 712 as such, the second cushion portion 702 of the first stopper 70 and the second cushion portion 712 of the second stopper 71 may have different degrees of softness (foam ratios) and have different characteristics. This makes it possible to adjust the mitigation of shock at the time of contact or collision of the first stopper 70 and the second stopper 71 using a combination of the second cushion portion 702 of the first stopper 70 and the second cushion portion 712 of the second stopper 71 that have different degrees of softness (different characteristics due to different foam ratios).

Figure 13:
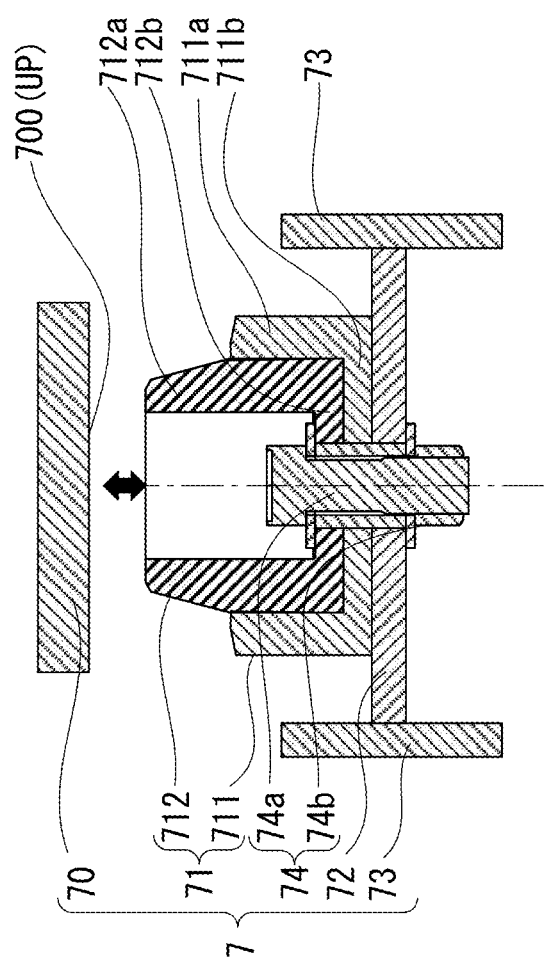
FIG. 13 is a schematic cross-sectional view of a restrictor of a working vehicle according to still another example embodiment of the present invention.
Figure 14:
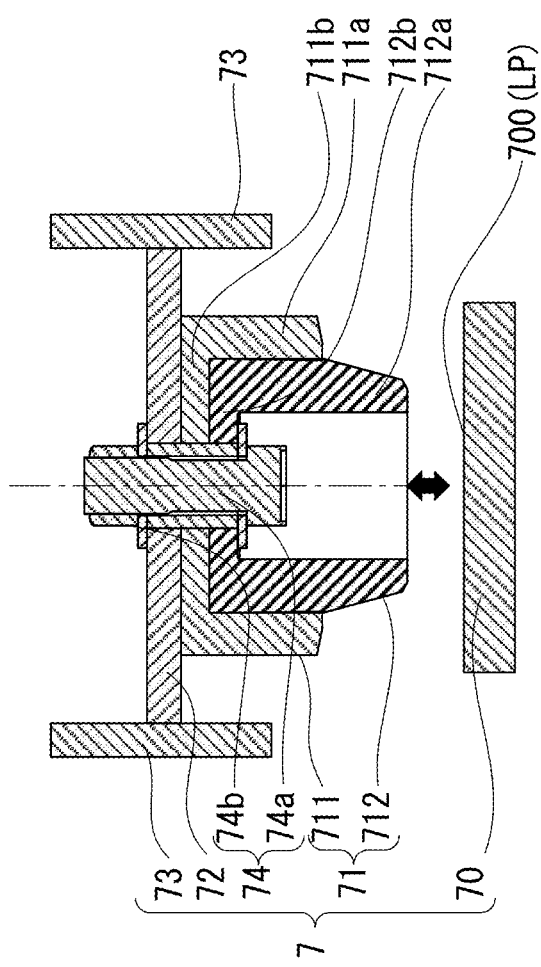
FIG. 14 is a schematic cross-sectional view of a restrictor of a working vehicle according to still another example embodiment of the present invention.

In the example embodiments described above, the restrictor 7 includes the pair of first stoppers 70 and the pair of second stoppers 71. However, this does not imply any limitation. For example, as illustrated in FIG. 13, the restrictor 7 may include the first stopper 70 that includes the receiving surface 700 facing down to perform restriction at the upper limit position UP and the second stopper 71 that includes the first cushion portion 711 and the second cushion portion 712. Alternatively, as illustrated in FIG. 14, the restrictor 7 may include the first stopper 70 that includes the receiving surface 700 facing up to perform restriction at the lower limit position LP and the second stopper 71 that includes the first cushion portion 711 and the second cushion portion 712.

Figure 15:
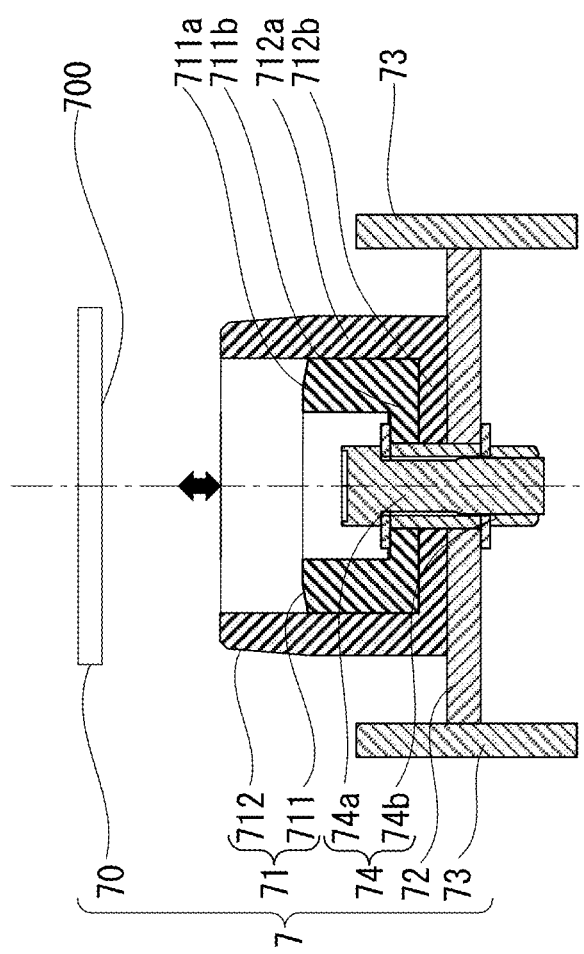
FIG. 15 is a schematic cross-sectional view of a restrictor of a working vehicle according to still another example embodiment of the present invention.

In the example embodiments described above, the first tubular portion 711a is provided outward of the second tubular portion 712a by fitting the second tubular portion 712a of the second cushion portion 712 in the first tubular portion 711a of the first cushion portion 711. However, this does not imply any limitation. For example, as illustrated in FIGS. 12 and 15, the second tubular portion 702a, 712a may be provided outward of the first tubular portion 701a, 711a by fitting the first tubular portion 701a, 711a of the first cushion portion 701, 711 in the second tubular portion 702a, 712a of the second cushion portion 702, 712.

Figure 16:
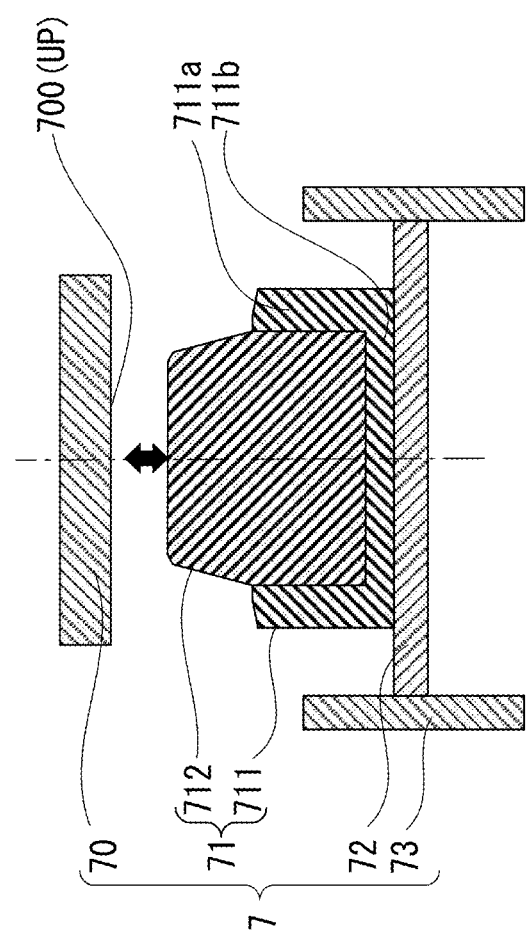
FIG. 16 is a schematic cross-sectional view of a restrictor of a working vehicle according to still another example embodiment of the present invention.

In the example embodiments described above, both the first cushion portion 711 and the second cushion portion 712 include the tubular portion (the first tubular portion 711a, the second tubular portion 712a). However, this does not imply any limitation. For example, as illustrated in FIG. 16, the member (the first cushion portion 711, the second cushion portion 712) that is fitted in the tubular portion may be solid. When the member that is internally fitted is solid as such, if a fastener is used for fastening, the presence of the fastener will hinder the cushioning performance, and therefore, in this case, mounting by bonding or the like is preferable.

In the example embodiments described above, the first cushion portion 711 and the second cushion portion 712 are adjacent to each other in a cross section as viewed from a direction orthogonal to the vertical direction, because the second cushion portion 712 (the second tubular portion 712a) is fitted in the tubular portion 711a (the first tubular portion 711a) of the first cushion portion 711. However, such an "adjacent" arrangement is not limited to that as viewed in cross section. The first cushion portion 711 and the second cushion portion 712 may be adjacent to each other as viewed externally from a direction orthogonal to the vertical direction. The point is that, if a plurality of second cushion portions 712 are provided densely around the first cushion portion 711 or if a plurality of first cushion portions 711 are provided densely around the second cushion portion 712, the result is a configuration similar to that in which the tubular portion 711a is provided. Therefore, the meaning of "adjacent to each other in a direction orthogonal to the vertical direction" encompasses not only arrangements in a cross-sectional view but also arrangements in an external view.

Figure 17:
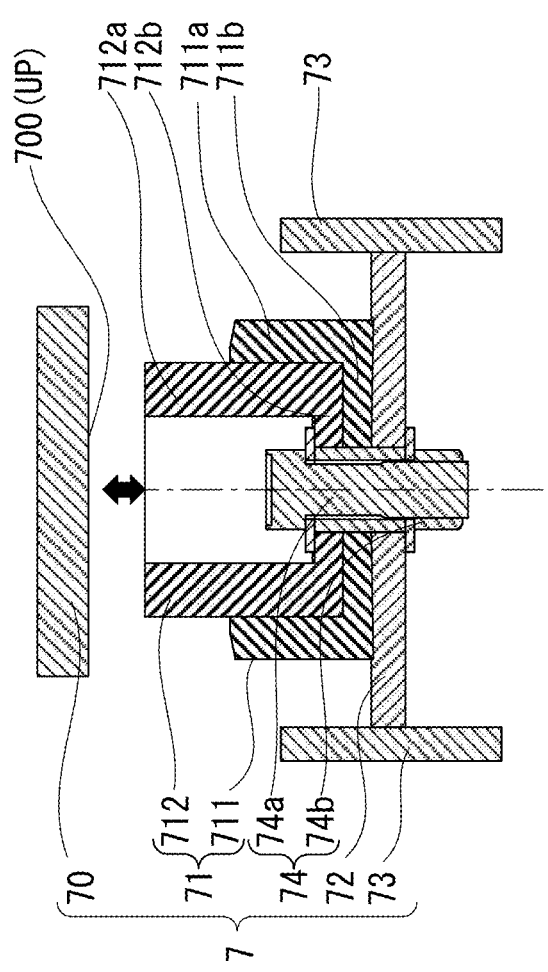
FIG. 17 is a schematic cross-sectional view of a restrictor of a working vehicle according to still another example embodiment of the present invention.

In the example embodiments described above, the distal end portion of the second cushion portion 712 projects from the first cushion portion 711 toward at least the other of the first stopper 70 and the second stopper 71 that is the target of contact, and the portion of the second cushion portion 712 that projects from the first cushion portion 711 has a cross-sectional area that decreases in a direction from the proximal end toward the distal end. However, this does not imply any limitation. For example, as illustrated in FIG. 17, the portion of the second cushion portion 712 that projects from the first cushion portion 711 may have a cross-sectional area that is constant or substantially constant in the direction from the proximal end toward the distal end.

Figure 18:
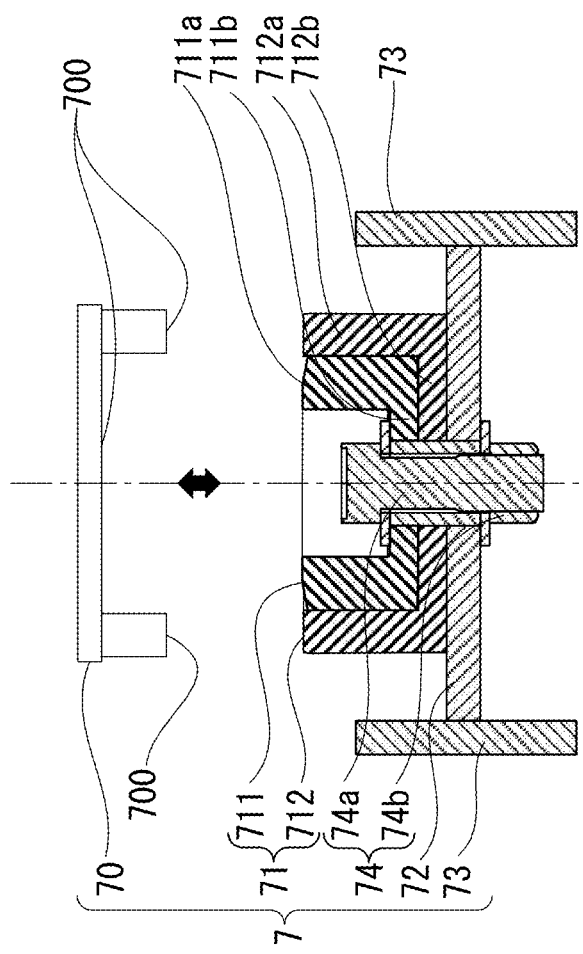
FIG. 18 is a schematic cross-sectional view of a restrictor of a working vehicle according to still another example embodiment of the present invention.

In the example embodiments described above, since the second cushion portion 712 projects to a greater extent than the first cushion portion 711 toward the target of contact, the second cushion portion 712 is configured to come into contact with the target of contact before the first cushion portion 711 does, when the contact of the first stopper 70 and the second stopper 71 occurs due to the vertical motion (vibrations) of the cabin 3. However, this does not imply any limitation. For example, the distal end of the second cushion portion 712 and the distal end of the first cushion portion 711 may be at the same level in the vertical direction as illustrated in FIG. 18, or the first cushion portion 711 may project such that its distal end is located closer to the target of contact than the distal end of the second cushion portion 712 is. In this case, it is only necessary that, at the target of contact, the area facing the second cushion portion 712 projects toward the second cushion portion 712 to a greater extent than the area facing the first cushion portion 711. This makes it possible to achieve the same effects as those achieved by the example embodiments described above because the second cushion portion 712 comes into contact with and is compressed by the target of contact before the first cushion portion 711 does.

In the example embodiments described above, the portion of the second cushion portion 712 that projects from the first cushion portion 711 has a cross-sectional area that decreases in a direction from the proximal end toward the distal end by having an outer diameter decreasing in the direction from the proximal end toward the distal end. However, this does not imply any limitation. For example, in a case where the second tubular portion 712a of the second cushion portion 712 has a cylindrical shape, its inner diameter may increase in the direction from the proximal end toward the distal end whereas its outer diameter is constant in the direction from the proximal end toward the distal end. Alternatively, in a case where the second tubular portion 712a of the second cushion portion 712 has a cylindrical shape, its outer diameter may decrease in the direction from the proximal end toward the distal end and its inner diameter may increase in the direction from the proximal end toward the distal end.

Figure 19:
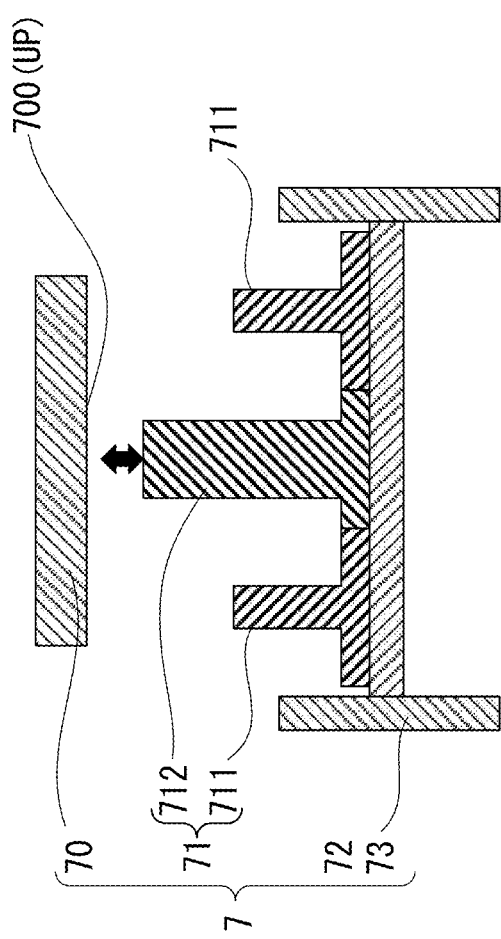
FIG. 19 is a schematic cross-sectional view of a restrictor of a working vehicle according to still another example embodiment of the present invention.

In the example embodiments described above, the second cushion portion 712 (the second tubular portion 712a) is fitted in the first tubular portion 711a of the first cushion portion 711. However, this does not imply any limitation. For example, as illustrated in FIGS. 19 and 20, both the first cushion portion 711 and the second cushion portion 712 may be solid, and they may be adjacent to each other in a direction orthogonal to the vertical direction. In this case, as illustrated in FIG. 19, the first cushion portion 711 and the second cushion portion 712 may be provided apart from each other, or as illustrated in FIG. 20, the first cushion portion 711 and the second cushion portion 712 may be in close contact with each other.

Although the first stopper 70 and the second stopper 71 for restriction at the upper limit position UP are illustrated in FIGS. 15 to 20 as examples of the restrictor 7 according to other example embodiments of the present invention, these example embodiments may be applied to the first stopper 70 and the second stopper 71 for restriction at the lower limit position LP. Alternatively or additionally, the example embodiments may be applied to the pair of first stoppers 70 and the pair of second stoppers 71 for restriction at the upper limit position UP and the lower limit position LP, as is the case with the example embodiments described above. In this case, the examples illustrated in FIGS. 15 to 20 may be used in any combination.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle, comprising:
a vehicle body;
a cabin; and
a restrictor to restrict vertical motion of the cabin at at least one of an upper limit position or a lower limit position; wherein
the restrictor includes:
  a first stopper fixed to the vehicle body; and
  a second stopper fixed to the cabin and movable toward and away from the first stopper as the cabin moves vertically;
at least one of the first stopper or the second stopper includes:
  a first cushion portion; and
  a second cushion portion softer than the first cushion portion, the first cushion portion and the second cushion portion being adjacent to each other in a direction intersecting a vertical direction; and
the second cushion portion is contactable with the first stopper or the second stopper before the first cushion portion as the cabin moves vertically.

2. The working vehicle according to claim 1, wherein the second cushion portion projects toward the first stopper or the second stopper to a greater extent than the first cushion portion.

3. The working vehicle according to claim 2, wherein
one of the first stopper and the second stopper includes a receiving surface which is planar;
the other of the first stopper and the second stopper includes the first cushion portion and the second cushion portion; and
the first cushion portion and the second cushion portion are oriented toward the receiving surface.

4. The working vehicle according to claim 1, wherein
one of the first cushion portion and the second cushion portion includes a tubular portion; and
the other of the first cushion portion and the second cushion portion is fitted in the tubular portion of the one of the first cushion portion and the second cushion portion.

5. The working vehicle according to claim 4, wherein
the first cushion portion includes the tubular portion; and
the second cushion portion is fitted in the tubular portion of the first cushion portion concentrically or substantially concentrically.

6. A working vehicle, comprising:
a vehicle body;
a cabin; and
a restrictor to restrict vertical motion of the cabin at at least one of an upper limit position or a lower limit position; wherein
the restrictor includes:
  a first stopper; and
  a second stopper movable toward and away from the first stopper as the cabin moves vertically;
at least one of the first stopper or the second stopper includes:
  a first cushion portion; and
  a second cushion portion softer than the first cushion portion, the first cushion portion and the second cushion portion being adjacent to each other in a direction intersecting a vertical direction; wherein the second cushion portion is contactable with the first stopper or the second stopper before the first cushion portion as the cabin moves vertically;

the first cushion portion includes a tubular portion; and the second cushion portion is fitted in the tubular portion of the first cushion portion concentrically or substantially concentrically;

the first cushion portion includes a first tubular portion defining the tubular portion and including a distal end portion and a proximal end portion, and a first base portion connected to the proximal end portion of the first tubular portion, the first base portion extending from an inner circumference of the first tubular portion toward a center of an inner hole of the first tubular portion; and the second cushion portion includes a second tubular portion including a distal end portion and a proximal end portion, and the proximal end portion of the second tubular portion is fitted in the first tubular portion concentrically or substantially concentrically.

7. The working vehicle according to claim 6, wherein a distal end portion of the second cushion portion projects from the first cushion portion toward at least the first stopper or the second stopper that is to be contacted by the distal end portion of the second cushion portion; and a portion of the second cushion portion that projects from the first cushion portion has a cross-sectional area that decreases in a direction from a proximal end toward a distal end.

8. The working vehicle according to claim 7, wherein the restrictor includes a pair of the first stoppers and a pair of the second stoppers;

the pair of first stoppers are displaced from each other at least in the vertical direction;

one of the pair of second stoppers is positioned such that the first cushion portion and the second cushion portion thereof are oriented toward one of the pair of first stoppers from below; and the other of the pair of second stoppers is positioned such that the first cushion portion and the second cushion portion thereof are oriented toward the other of the pair of first stoppers from above.

9. The working vehicle according to claim 8, wherein the restrictor further includes:

a mount portion coupled to the cabin; and a fastener to fasten the pair of second stoppers to the mount portion;

each of the pair of second stoppers is configured such that the second cushion portion includes a second base portion connected to the proximal end portion of the second tubular portion, the second base portion extending from an inner circumference of the second tubular portion toward a center of an inner hole of the second tubular portion;

the pair of first stoppers face each other with a space therebetween in the vertical direction;

the first base portions of the first cushion portions of the pair of second stoppers sandwich the mount portion; and the fastener fastens the pair of second stoppers and the mount portion such that the fastener extends through the first base portions and the second base portions of the pair of second stoppers and the mount portion.

* * * * *